US010827476B2

(12) United States Patent
Bhattad et al.

(10) Patent No.: US 10,827,476 B2
(45) Date of Patent: Nov. 3, 2020

(54) CONTROL RESOURCE SET DESIGN UNDER SINGLE CARRIER WAVEFORM

(71) Applicant: QUALCOMM Incorporated, San Diego, CA (US)

(72) Inventors: Kapil Bhattad, Bangalore (IN); Jing Sun, San Diego, CA (US); Xiaoxia Zhang, San Deigo, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/151,262

(22) Filed: Oct. 3, 2018

(65) Prior Publication Data

US 2019/0110277 A1    Apr. 11, 2019

(30) Foreign Application Priority Data

Oct. 10, 2017  (IN) .............................. 201741035951

(51) Int. Cl.
*H04W 72/04*   (2009.01)
*H04L 1/00*    (2006.01)
*H04L 5/00*    (2006.01)

(52) U.S. Cl.
CPC ......... *H04W 72/042* (2013.01); *H04L 1/0026* (2013.01); *H04L 1/0027* (2013.01); *H04L 5/0023* (2013.01); *H04L 5/0051* (2013.01); *H04L 5/0053* (2013.01); *H04L 5/0091* (2013.01)

(58) Field of Classification Search
CPC .. H04W 72/042; H04L 5/0051; H04L 5/0023; H04L 5/0091; H04L 5/0053; H04L 1/0026; H04L 1/0027
See application file for complete search history.

(56) References Cited

U.S. PATENT DOCUMENTS

2013/0115988 A1*  5/2013  Sun ..................... H04B 1/10
                                              455/501
2018/0262313 A1*  9/2018  Nam ................... H04L 5/005

OTHER PUBLICATIONS

Panasonic: "Configuration of DL control resource set and UE bandwidth", 3GPP Draft; R1-1700639, 3rd Generation Partnership Project (3GPP), Mobile Competence Centre, 650, Route Des Lucioles; F-06921 Sophia-Antipolis Cedex, France, vol. RAN WG1, no. Spokane, USA; 20170116-20170120, Jan. 16, 2017 (Jan. 16, 2017), pp. 1-5, XP051208164, Retrieved from the Internet: URL: http://www.3gpp.org/ftp/Meetings_3GPP_SYNC/RAN1/Docs/.

(Continued)

*Primary Examiner* — Afshawn M Towfighi
(74) *Attorney, Agent, or Firm* — Holland & Hart LLP/Qualcomm

(57) ABSTRACT

Methods, systems, and devices for wireless communications are described. A user equipment (UE) may determine a control resource set configuration for transmissions using a single carrier waveform. The control resource set configuration may include one or more pilot regions and one or more control channel regions. The UE may monitor one or more of the pilot signal regions to identify pilot signals based at least in part on the control resource set configuration, and decode one or more control signals in the control channel regions based at least in part on the pilot signals. The control signals may be included in a control channel region associated with the pilot signal region or in a shared control channel region.

42 Claims, 18 Drawing Sheets

(56) References Cited

OTHER PUBLICATIONS

Samsung: "Considerations for Flexible Bandwidth in NR", 3GPP Draft; R2-1703451 Considerations for Flexible Bandwidth in NR, 3rd Generation Partnership Project (3gpp), Mobile Competence Centre; 650, Route Des Lucioles; F-06921 Sophia-Antipol, vol. RAN WG2, No. Spokane, USA; 20170403-20170407 Apr. 3, 2017, XP051245307, Retrieved from the Internet: URL:http://www.3gpp.org/ftp/Meetings_3GPP_SYNC/RAN2/Docs/ [retrieved on Apr. 3, 2017], 6 pages.
Huawei, et al: "PDCCH Reliability for URLLC," 3GPP Draft; R1-1717086, 3rd Generation Partnership Project (3GPP), Mobile Competence Centre; 650, Route Des Lucioles; F-06921 Sophia-Antipolis Cedex; France, vol. Ran WG1, no. Prague, Czech Republic; 20171009-20171013, Oct. 8, 2017, XP051340277, 7 pages, Retrieved from the Internet: URL: http://www.3gpp.org/ftp/Meetings_3GPP_SYNC/RAN1/Docs/ [retrieved on Oct. 8, 2017].
International Search Report and Written Opinion—PCT/US2018/054443—ISA/EPO—dated Jan. 21, 2019 (175613WO).
Samsung: "On PDCCH Structure," 3GPP Draft; R1-1717641 on PDCCH Structure, 3rd Generation Partnership Project (3GPP), Mobile Competence Centre; 650, Route Des Lucioles; F-06921 Sophia-Antipolis Cedex; France, vol. Ran WG1, no. Prague, CZ; 20171009-20171013, Oct. 8, 2017, XP051340827, pp. 1-7, Retrieved from the Internet: URL: http://www.3gpp.org/ftp/Meetings_3GPP_SYNC/RAN1/Docs/ [retrieved on Oct. 8, 2017].

\* cited by examiner

CONTROL RESOURCE SET DESIGN UNDER SINGLE CARRIER WAVEFORM

CROSS REFERENCES

The present Application for Patent claims the benefit of India Provisional Patent Application No. 201741035951 by BHATTAD et al., entitled "CONTROL RESOURCE SET DESIGN UNDER SINGLE CARRIER WAVEFORM," filed Oct. 10, 2017, assigned to the assignee hereof, and expressly incorporated herein.

BACKGROUND

The following relates generally to wireless communication and to control resource set design under single carrier waveform.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support control resource set design under single carrier waveform. A single carrier waveform transmission may be configured (e.g., by a base station) based at least in part on a control resource set configuration defining one or more pilot regions and one or more control regions. Each pilot region may be for a particular wireless device (e.g., a user equipment (UE)) in the network, or may be available for transmissions to any wireless device in the network. Each control region may correspond to a particular pilot region. In other examples, the control resource set configuration may define a single shared control region. A wireless device in the network may monitor one or more of the pilot regions to identify pilot signals for the UE, and may decode control channel signals in the control region based at least in part on the pilot signals.

A method of wireless communication is described. The method may include receiving an indication of a configuration for a control resource set used for a single carrier waveform transmission, the control resource set comprising one or more pilot regions and one or more control channel regions corresponding to the one or more pilot regions, the one or more pilot regions and the one or more control channel regions spanning a bandwidth of the single carrier waveform transmission, monitoring, based at least in part on the received indication of the configuration, a first pilot region of the one or more pilot regions of the control resource set for a pilot signal for the UE, and decoding, based at least in part on the pilot signal, a control channel signal for the UE received in a first control channel region of the one or more control channel regions of the control resource set.

An apparatus for wireless communication is described. The apparatus may include means for receiving an indication of a configuration for a control resource set used for a single carrier waveform transmission, the control resource set comprising one or more pilot regions and one or more control channel regions corresponding to the one or more pilot regions, the one or more pilot regions and the one or more control channel regions spanning a bandwidth of the single carrier waveform transmission, means for monitoring, based at least in part on the received indication of the configuration, a first pilot region of the one or more pilot regions of the control resource set for a pilot signal for the UE, and means for decoding, based at least in part on the pilot signal, a control channel signal for the UE received in a first control channel region of the one or more control channel regions of the control resource set.

Another apparatus for wireless communication is described. The apparatus may include a processor, memory in electronic communication with the processor, and instructions stored in the memory. The instructions may be operable to cause the processor to receive an indication of a configuration for a control resource set used for a single carrier waveform transmission, the control resource set comprising one or more pilot regions and one or more control channel regions corresponding to the one or more pilot regions, the one or more pilot regions and the one or more control channel regions spanning a bandwidth of the single carrier waveform transmission, monitor, based at least in part on the received indication of the configuration, a first pilot region of the one or more pilot regions of the control resource set for a pilot signal for the UE, and decode, based at least in part on the pilot signal, a control channel signal for the UE received in a first control channel region of the one or more control channel regions of the control resource set.

A non-transitory computer readable medium for wireless communication is described. The non-transitory computer-readable medium may include instructions operable to cause a processor to receive an indication of a configuration for a control resource set used for a single carrier waveform transmission, the control resource set comprising one or more pilot regions and one or more control channel regions corresponding to the one or more pilot regions, the one or more pilot regions and the one or more control channel regions spanning a bandwidth of the single carrier waveform transmission, monitor, based at least in part on the received indication of the configuration, a first pilot region of the one or more pilot regions of the control resource set for a pilot signal for the UE, and decode, based at least in part on the pilot signal, a control channel signal for the UE received in a first control channel region of the one or more control channel regions of the control resource set.

In some examples of the method, apparatus, and non-transitory computer-readable medium described above, monitoring for the pilot signal comprises: monitoring, based at least in part on the received indication of the configuration, the one or more pilot regions of the control resource set for the pilot signal for the UE, each of the one or more pilot regions time division multiplexed with a corresponding one of the one or more control channel regions.

In some examples of the method, apparatus, and non-transitory computer-readable medium described above, the one or more control channel regions may be non-overlapping. In some examples of the method, apparatus, and non-transitory computer-readable medium described above, each one of the one or more control channel regions may be associated with one of the one or more pilot regions, the one of the one or more control channel regions and the associated one of the one or more pilot regions associated with a same transmission beam.

In some examples of the method, apparatus, and non-transitory computer-readable medium described above, the control channel signal may be restricted by the configuration to be transmitted within one of the one or more control channel regions.

In some examples of the method, apparatus, and non-transitory computer-readable medium described above, the UE may be configured to monitor only one of the one or more control channel regions for control channel signals.

In some examples of the method, apparatus, and non-transitory computer-readable medium described above, the control channel signal spans at least two of the one or more control channel regions.

In some examples of the method, apparatus, and non-transitory computer-readable medium described above, monitoring for the pilot signal comprises: monitoring, based at least in part on the received indication of the configuration, the one or more pilot regions of the control resource set for the pilot signal for the UE, the one or more pilot regions comprising a plurality of time division multiplexed pilot regions for a plurality of UEs.

Some examples of the method, apparatus, and non-transitory computer-readable medium described above may further include processes, features, means, or instructions for monitoring the shared control channel region of the control resource set for the control channel signal for the UE.

Some examples of the method, apparatus, and non-transitory computer-readable medium described above may further include processes, features, means, or instructions for monitoring, based at least in part on the received indication of the configuration, a second pilot region of the one or more pilot regions for a second pilot signal for the UE. Some examples of the method, apparatus, and non-transitory computer-readable medium described above may further include processes, features, means, or instructions for decoding, based at least in part on second pilot signal, a control channel signal for the UE received in a second control channel region of the one or more control channel regions of the control resource set.

In some examples of the method, apparatus, and non-transitory computer-readable medium described above, the received indication of the configuration for the control resource set comprises: a first control region group comprising the first pilot region and the first control channel region. In some examples of the method, apparatus, and non-transitory computer-readable medium described above, a second control region group comprising the second pilot region and the second control channel region. In some examples of the method, apparatus, and non-transitory computer-readable medium described above, the first control channel region and the second control channel region are a same control channel region.

In some examples of the method, apparatus, and non-transitory computer-readable medium described above, the control channel signal in the first control channel region comprises a first portion of a control channel transmission for the UE.

Some examples of the method, apparatus, and non-transitory computer-readable medium described above may further include processes, features, means, or instructions for identifying a plurality of pilot regions for a plurality of control resource sets. Some examples of the method, apparatus, and non-transitory computer-readable medium described above may further include processes, features, means, or instructions for monitoring a subset of the plurality of pilot regions for the pilot signal for the UE.

Some examples of the method, apparatus, and non-transitory computer-readable medium described above may further include processes, features, means, or instructions for receiving, from a base station, an identification of the subset of the plurality of pilot regions for the UE to monitor.

In some examples of the method, apparatus, and non-transitory computer-readable medium described above, decoding the control channel signal comprises: determining a channel estimate based at least in part on the received pilot signal. Some examples of the method, apparatus, and non-transitory computer-readable medium described above may further include processes, features, means, or instructions for decoding the control channel signal based at least in part on the channel estimate.

Some examples of the method, apparatus, and non-transitory computer-readable medium described above may further include processes, features, means, or instructions for receiving, from a base station, an indication of the configuration for the control resource set.

In some examples of the method, apparatus, and non-transitory computer-readable medium described above, a first time resources for the control resource set may be of a different size, or overlap at least in part with, or a combination thereof, than second time resources for a second control resource set.

In some examples of the method, apparatus, and non-transitory computer-readable medium described above, the control channel signal comprises downlink control information, or an uplink grant, or a downlink grant, or a combination thereof.

In some examples of the method, apparatus, and non-transitory computer-readable medium described above, the pilot signal comprises a demodulation reference signal (DMRS). In some examples of the method, apparatus, and non-transitory computer-readable medium described above, the control channel signal comprises a physical downlink control channel (PDCCH).

In some examples of the method, apparatus, and non-transitory computer-readable medium described above, pilot signals in different pilot regions of the one or more pilot regions may be transmitted using different beams.

Some examples of the method, apparatus, and non-transitory computer-readable medium described above may further include processes, features, means, or instructions for determining that the one or more pilot regions are associated with a same control channel. Some examples of the method, apparatus, and non-transitory computer-readable medium described above may further include processes, features, means, or instructions for performing independent channel estimation for pilot signals in different pilot regions of the one or more pilot regions. Some examples of the method, apparatus, and non-transitory computer-readable medium described above may further include processes, features, means, or instructions for performing a joint channel estimation for the one or more pilot regions that are associated with the same control channel.

In some examples of the method, apparatus, and non-transitory computer-readable medium described above, a bandwidth of a single carrier waveform transmission for the first pilot region and the first control channel region may be different than a bandwidth of a single carrier waveform transmission for a second pilot region of the one or more pilot regions and a second control channel region of the one or more control channel regions.

A method of wireless communication is described. The method may include identifying, at the base station, a configuration for a control resource set used to transmit control data using a single carrier waveform transmission, transmitting pilot signals in one or more pilot regions of the control resource set, the one or more pilot regions spanning a bandwidth of the single carrier waveform transmission, and transmitting control channel signals in one or more control channel regions of the control resource set, the control channel signals corresponding to the pilot signals, and the one or more control channel regions spanning the bandwidth of the single carrier waveform transmission.

An apparatus for wireless communication is described. The apparatus may include means for identifying, at the base station, a configuration for a control resource set used to transmit control data using a single carrier waveform transmission, means for transmitting pilot signals in one or more pilot regions of the control resource set, the one or more pilot regions spanning a bandwidth of the single carrier waveform transmission, and means for transmitting control channel signals in one or more control channel regions of the control resource set, the control channel signals corresponding to the pilot signals, and the one or more control channel regions spanning the bandwidth of the single carrier waveform transmission.

Another apparatus for wireless communication is described. The apparatus may include a processor, memory in electronic communication with the processor, and instructions stored in the memory. The instructions may be operable to cause the processor to identify, at the base station, a configuration for a control resource set used to transmit control data using a single carrier waveform transmission, transmit pilot signals in one or more pilot regions of the control resource set, the one or more pilot regions spanning a bandwidth of the single carrier waveform transmission, and transmit control channel signals in one or more control channel regions of the control resource set, the control channel signals corresponding to the pilot signals, and the one or more control channel regions spanning the bandwidth of the single carrier waveform transmission.

A non-transitory computer readable medium for wireless communication is described. The non-transitory computer-readable medium may include instructions operable to cause a processor to identify, at the base station, a configuration for a control resource set used to transmit control data using a single carrier waveform transmission, transmit pilot signals in one or more pilot regions of the control resource set, the one or more pilot regions spanning a bandwidth of the single carrier waveform transmission, and transmit control channel signals in one or more control channel regions of the control resource set, the control channel signals corresponding to the pilot signals, and the one or more control channel regions spanning the bandwidth of the single carrier waveform transmission.

Some examples of the method, apparatus, and non-transitory computer-readable medium described above may further include processes, features, means, or instructions for timing division multiplexing each of the pilot signals of the control resource set with each of the control channel signals of the control resource set.

In some examples of the method, apparatus, and non-transitory computer-readable medium described above, the one or more pilot regions comprise a single pilot region for one UE and the one or more control channel regions comprise a single control channel region corresponding to the single pilot region for the one UE.

In some examples of the method, apparatus, and non-transitory computer-readable medium described above, the control resource set comprises a single pilot region and a single control channel region.

Some examples of the method, apparatus, and non-transitory computer-readable medium described above may further include processes, features, means, or instructions for timing division multiplexing a first pilot signal in a first pilot region of the control resource set for a first UE, a second pilot signal in a second pilot region of the control resource set for a second UE, and a first control channel signal and a second control channel signal in a shared control channel region of the control resource set for at least the first UE and the second UE.

Some examples of the method, apparatus, and non-transitory computer-readable medium described above may further include processes, features, means, or instructions for timing division multiplexing the pilot signals with corresponding control region groups, the corresponding control region groups comprising the control channel signals.

In some examples of the method, apparatus, and non-transitory computer-readable medium described above, a first control resource set comprises a first pilot region and a first control channel region, the first control channel region for a first portion of a control channel signal for a single UE, and the first pilot region for a first pilot signal corresponding to the first portion of the control channel signal for the single UE. In some examples of the method, apparatus, and non-transitory computer-readable medium described above, a second control resource set comprises a second pilot region and a second control channel region, the second control channel region for a second portion of the control channel signal for the single UE, and the second pilot region for a second pilot signal corresponding to the second portion of the control channel signal for the single UE.

Some examples of the method, apparatus, and non-transitory computer-readable medium described above may further include processes, features, means, or instructions for inserting a cyclic prefix or a guard interval between at least two regions of the control resource set, the at least two regions comprising at least one of the one or more pilot regions, or at least one of the one or more control channel regions, or a combination thereof.

Some examples of the method, apparatus, and non-transitory computer-readable medium described above may further include processes, features, means, or instructions for transmitting an indication of the configuration for the control resource set.

DETAILED DESCRIPTION

Figure 1:
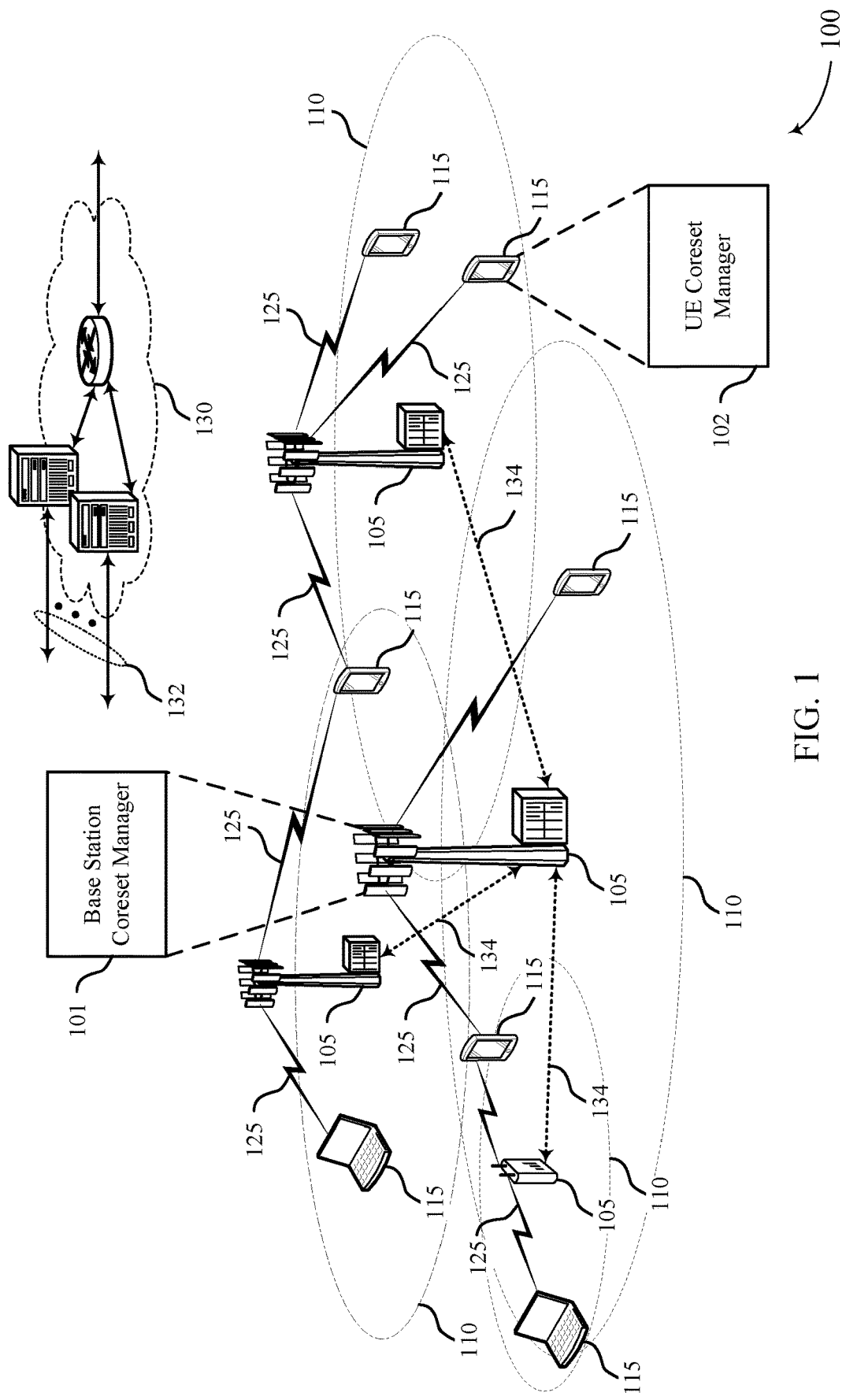
FIG. 1 illustrates an example of a system for wireless communication that supports control resource set design under single carrier waveform in accordance with aspects of the present disclosure.

In some wireless communication systems, control data may be transmitted using frequency division multiplexing (e.g., orthogonal frequency division multiplexing (OFDM)). The base station may transmit control data for multiple UEs in a single OFDM symbol. Each UE may be associated with (have a corresponding) one or more control resource sets (coresets), which may be defined based on a frequency range. The UE may monitor the control channel within its corresponding coreset to obtain the control data.

In some situations, it may be desirable to use a single-carrier waveform design. For example, use of a single-carrier waveform may reduce the peak to average power ratio (PAPR) as compared to, for example, OFDM or a mixed waveform system that includes two or more types of waveforms. The single-carrier waveform may be, for example, single-carrier quadrature amplitude modulation (SC-QAM) or single-carrier frequency division modulation (SC-FDM). In a single-carrier waveform system, UEs in a network may have different bandwidth capabilities. As such, assigning coresets to particular frequency resources may not be optimal because some frequency resources may not be available to the UE to which the coreset is intended to be transmitted. Moreover, in some mmW systems, an analog beam may be used, such that it is difficult to frequency division multiplex multiple UEs in the same OFDM symbol. In addition, different UEs may utilize different beams, and accordingly, frequency division multiplexing may require transmitting multiple pilots (pilot signals) corresponding to different beams.

In systems using control signals using OFDM, a coreset may be defined by a group of contiguous or non-contiguous resource blocks (RBs), and one or more contiguous OFDM symbols. The control signals of the coreset may be transmitted in a PDCCH in the control channel region using an OFDM waveform. Some or all of the RBs for the coreset may be bundled. In some examples, the bundled coresets may be contiguous and use the same beam and/or precoding. In some examples, the coreset may have a minimum bundling size (e.g., two RBs as a minimum for the coreset). The RBs of the coreset may be made up of multiple resource element groups (REGs), which in some examples may comprise a fixed number of tones (e.g., 12 tones) of the same OFDM symbol of an RB.

However, in a system using single-carrier transmissions, the OFDM resource elements may instead be time domain resource elements across the single-carrier bandwidth. The UEs of the single-carrier system may operate using a number of different bandwidths. These UEs may also be associated with different transmit beams of a base station, for example, in a mmW system using beamforming techniques. The base station may need to provide multiple pilot signals corresponding to different transmit beams. In some cases different beams may be associated with different single-carrier waveform bandwidths. From the perspective of any particular UE, the control signal transmission (e.g., a PDCCH) that the UE may receive is based on the bandwidth capability of the UE. A first UE may operate using a first bandwidth, while a second UE, third UE, fourth UE, and so on may use different bandwidths. From the perspective of a given base station, the base station may also frequency multiplex single-carrier waveforms, for example using multi-channel single-carrier quadrature amplitude modulation (MC-SC-QAM).

In transmissions using a single-carrier waveform, the base station may alleviate the concerns with frequency division multiplexing of coresets by transmitting control information by time division multiplexing pilot signals and control signals according to a control resource set configuration (i.e., a coreset).

The pilot signals of the coreset may be, for example, demodulation reference signals (DMRS). The control signals may be or include, for example, downlink control information (DCI) or an uplink and/or downlink grant. The control resource set configuration may define one or more pilot regions and one or more control channel regions, and the base station may transmit pilot signals in the pilot regions and control signals in the control channel regions.

UEs in a wireless communication system may be configured with one or more control resource sets. Each UE may monitor the pilot signals portions of a transmission and decode the control signals in the control channel regions of the transmission based at least in part on the pilot signals. In some examples, each pilot region may be associated with (e.g., correspond to) a control resource set. UEs may monitor the pilot regions corresponding to the configured control resource sets and identify the pilot signals. The UEs may then decode the control signals in a corresponding (e.g., associated) control channel region (e.g., a control resource set-specific control channel region or a shared control channel region) based at least in part on the pilot signals.

In some other examples, each pilot region may be available for use by the base station to transmit information for any control resource set. A UE may monitor each pilot region to determine whether the pilot region includes a pilot signal for a control resource set configured for that UE. When the UE determines that such a pilot signal is present, the UE may decode control signals in a corresponding set of resource elements (which may be a control region group) based at least in part on the pilot signal.

Aspects of the disclosure are initially described in the context of a wireless communications system. Aspects of the disclosure are further illustrated by and described with reference to apparatus diagrams, system diagrams, and flowcharts that relate to control resource set design under single carrier waveform.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may include a base station control resource set (coreset) manager 101, which may determine a coreset configuration for the wireless communications system. The coreset configuration may include one or more pilot regions and one or more control channel regions. The base station coreset manager 101 may also prepare transmissions of control information based at least in part on the coreset configuration. The base station coreset manager 101 may time division multiplex pilot signals and control signals such that the pilot signals are in the pilot regions and the control signals are in the control channel regions.

UEs 115 may include a UE coreset manager 102, which may determine how to process transmissions sent by a base station 105 in accordance with the coreset configuration and received at one or more of the UEs 115. The UE coreset manager 102 may receive the coreset configuration, or an indication thereof, from the base station 105. The UE coreset manager 102 may determine which of the pilot regions to monitor to identify pilot signals for the coresets configured for the UE 115. In some examples, the UE coreset manager 102 may determine that the UE 115 monitors all pilot regions based at least in part on the coreset configuration. In some other examples, the UE coreset manager 102 may determine that a subset of one or more pilot regions is reserved for pilots associated with the configured coresets, and may monitor only those pilot regions to identify pilot signals.

The UE coreset manager 102 may determine which control channel regions to decode based at least in part on the coreset configuration. In some examples, each pilot region may be associated with a corresponding control channel region, and the UE coreset manager 102 may determine to decode the control signals in the corresponding control channel region based at least in part on the pilot signal (or signals) in the pilot region. In some examples, the transmission may include a shared control channel region, and the UE coreset manager 102 may determine to decode the control signals in the shared control channel region based at least in part on the pilot signals associated with the configured coresets.

Defining a number of different coreset configurations or designs that use different TDM techniques may allow a base station 105 to switch beams between coresets for different UEs 115 or sets of UEs 115. For example a base station 105 may transmit a first coreset using a first transmit beam to a set of one or more UEs, then switch to a second transmit beam to transmit a second coreset to a second set of one or more UEs. A third coreset may then be transmitted using the first transmit beam, the second transmit beam, or a third transmit beam. The TDM coresets may allow the base station to use different transmit beams to quickly and efficiently transmit control information in a number of different directions to a number of different UEs. The TDM coresets may include one or more examples of coreset configuration 300, coreset configuration 500, and/or coreset configuration 700, as discussed with reference to FIGS. 3-8.

Figure 2:
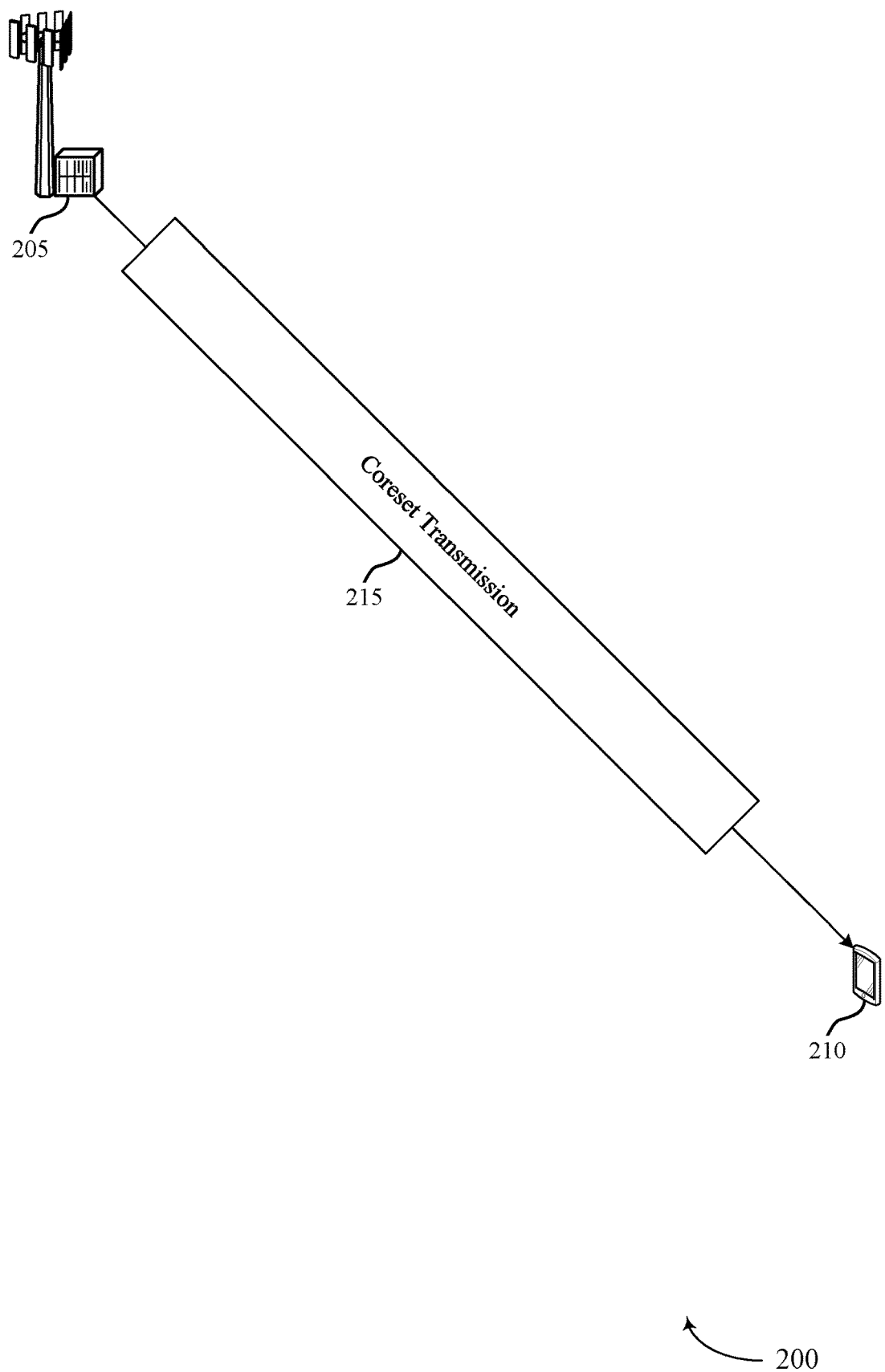
FIG. 2 illustrates an example of a wireless communications system that supports control resource set design under single carrier waveform in accordance with aspects of the present disclosure.

FIG. 2 illustrates an example of a wireless communications system 200 that supports control resource set design under single carrier waveform in accordance with various aspects of the present disclosure. In some examples, wireless communications system 200 may implement aspects of wireless communications system 100. The wireless communications system 200 may include a base station 205 and a UE 210, which may be examples of aspects of base station 105 and UE 115 described with reference to FIG. 1.

For downlink transmissions, a base station 105 may transmit a coreset transmission 215 to the UE 210. The coreset transmission 215 may be a downlink transmission sent in accordance with a coreset configuration. The coreset transmission 215 may include one or more pilot regions and one or more control channel regions in accordance with the coreset configuration. The one or more pilot regions and the one or more control channel regions may be time division multiplexed based at least in part on the coreset configuration to generate the coreset transmission 215. The one or more pilot regions may contain pilot signals such as DMRS. The one or more control channel regions may include encoded control information such as downlink control information (DCI) or a downlink and/or uplink grant. In some examples, one or more control channel regions are the same.

In some examples, the coreset configuration may define a plurality of coresets, with each coreset including one or more pilot regions and corresponding control channel regions. The UE 210 may determine which coresets of the plurality of coresets are associated with the UE 210 based at least in part on the coreset configuration, which the UE 210 may receive from the base station 205 upon connecting with a wireless communication cell. In some examples, the UE 210 may be associated with only one coreset. In some other examples, the UE 210 may be associated with two or more coresets.

The UE 210 may monitor the pilot regions of the associated coresets to identify pilot signals. The UE 210 may decode the control signals in the corresponding control channel regions based at least in part on the pilot signals.

In some examples, the coreset configuration may define a plurality of pilot regions and a single shared control channel region. The UE 210 may determine which pilot regions of the plurality of pilot regions are associated with the UE 210 based at least in part on the coreset configuration, which the UE 210 may receive from the base station 205 upon connecting with a wireless communication cell. In some examples, the UE 210 may be associated with only one pilot region. In some other examples, the UE 210 may be associated with two or more pilot regions.

The UE 210 may monitor the associated pilot regions to identify pilot signals. For example, the UE 210 may determine a channel estimate for each of the associated pilot regions and determine that a pilot signal is present in the pilot region based at least in part on the channel estimate.

The UE 210 may decode the signals in the shared control channel region based at least in part on the pilot signals. The UE 210 may decode the signals in the shared control channel region for every identified pilot signal. If the UE 210 does not identify any pilot signals (e.g., based on the channel estimate), the UE 210 may refrain from decoding the signals in the shared control channel region. If the UE 210 identifies two or more pilot signals, the UE 210 may separately decode the signals in the shared control region based at least in part on each of the two or more pilot signals.

In some examples, the coreset configuration may define a plurality of pilot regions, with each pilot region being associated with a control region group. Each control region group may be, for example, a size of one channel control element (CCE) or, in another example, a size of two CCEs, with the control channel transmission being performed in units of CCEs such as 1 CCE or 2 CCEs. Each pilot region and the associated control region group may not be associated with a particular UE, but rather may be available for the base station 205 to use for transmitting control signals to any UE in a cell.

The UE 210 may monitor each of the plurality of pilot regions in order to identify pilot signals associated with the UE 210. The UE 210 may determine that a pilot signal in a pilot region is associated with the UE 210, and may decode the control signals in the corresponding control region group based at least in part on the pilot signal. In some examples, the UE 210 may determine that pilot signals in multiple pilot regions are associated with the same control signal for UE 210. The UE 210 may determine a joint channel estimate based at least in part on the identified pilot signals, and may decode the control signals in the corresponding control region group based at least in part on the joint channel estimate. A joint channel estimate may be an average of the individual channel estimates.

In a system using single-carrier transmissions, a base station may need to provide multiple pilot signals corresponding to different transmit beams because UEs of the single-carrier system may operate using a number of different bandwidths. From the perspective of any particular UE, the control signal transmission (e.g., a PDCCH) that the UE may receive is based on the bandwidth capability of the UE. Therefore, the UE 210 may monitor each of the plurality of pilot regions in the coreset configuration in order to determine which pilot signals are associated with the UE 210. In turn, the UE 210 may receive a control region group that operates on a bandwidth corresponding to the UE 210.

In some examples, a wider bandwidth may be used (e.g., for a synchronization signal), in which case a shorter slot duration is needed to transmit the same amount of information. In some cases a synchronization signal may support larger slot aggregation levels for PDSCH to avoid frequency PDCCH monitoring. Accordingly, the base station 205 may transmit using slot aggregation, in which one PDCCH scheduling PDSCH may span more than one slot. The UE 210 may monitor the PDCCH by subsampling across slots, e.g., by sampling the signal once in every two slots.

In some examples, an interlace (a set of frequency resources) may be used for transmissions over the control channel (e.g., the PDCCH), for example to mitigate issues related to power spectral density (PSD) limitations. For example, a PDSCH interlace (e.g., for LAA) may include ten resource blocks evenly spaced across the available bandwidth. For example, for a 20 MHz interlace with 100 RBs, a first interlace may be of RB0, RB10, . . . , RB90; a second interlace may be of RB1, RB11, . . . , RB91; and so on to RB9, RB19, . . . , RB99. In other examples, different interlace patterns or configurations may be used. For a particular UE 210, a PDCCH interlace may be limited to a smaller bandwidth than a PDSCH interlace. For example, a PDCCH interlace may be limited to span 20 MHz while a PDSCH interlace may span 80 MHz. A control region group may have a minimum bundling size. For example, the minimum bundling size may be two resource blocks, which may in some circumstances be reduced to one resource block to increase flexibility. In addition, support for larger aggregation levels or repetition in frequency may be introduced to further mitigate the impact of PSD limitations.

In some example, UE 210 may monitor, based on a received indication of a configuration for a control resource set, one or more pilot regions of the control resource set for the pilot signal for the UE, each of the one or more pilot regions time division multiplexed with a corresponding one of the one or more control channel regions. An example of advantages of such monitoring is a more straightforward implementation, the UEs having different beams may be multiplexed, and may in some cases allow for the use of a single control channel element (CCE) in the same control channel (e.g., PDCCH) region while the rest of the resources in the control channel region are allocated to other PDCCH.

In some example, UE 210 the one or more control channel regions are non-overlapping and each one of the one or more control channel regions is associated with one of the one or more pilot regions, the one of the one or more control channel regions and the associated one of the one or more pilot regions associated with a same transmission beam. Examples of advantages of such configuration is that the control channel region can be shared in a finer resolution than the OFDM symbol level, DMRS scheduling flexibility may be increased, control channel trunking gain may be improved, and UE power savings may be improved by allowing a UE to return to sleep if a DMRS for the UE is not detected.

In some example, UE 210 monitoring, based at least in part on the received indication of the configuration, the one or more pilot regions of the control resource set for the pilot signal for the UE, the one or more pilot regions comprising a plurality of time division multiplexed pilot regions for a plurality of UEs. An example of an advantage of such monitoring is lower pilot overhead than when each pilot is TDM.

Figure 3:
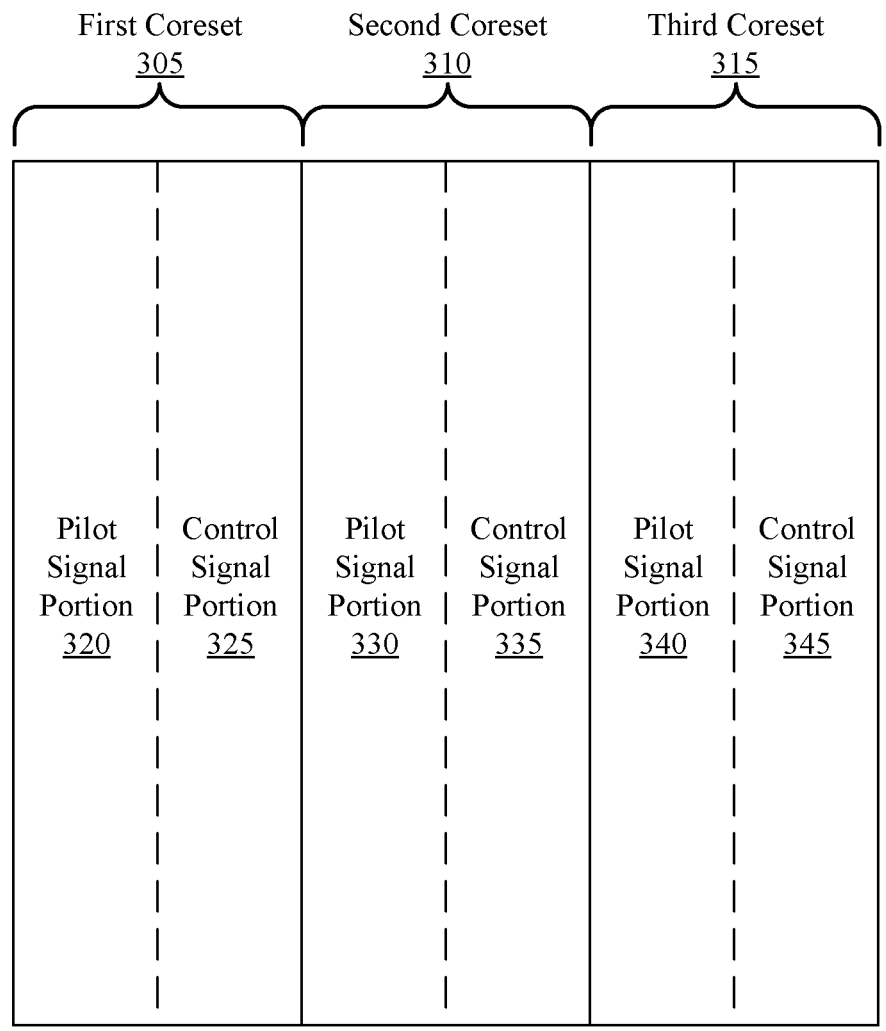
FIG. 3 illustrates an example of a control resource set configuration that supports control resource set design under single carrier waveform in accordance with aspects of the present disclosure.

FIG. 3 illustrates an example of a coreset configuration 300 that supports control resource set design under single carrier waveform in accordance with various aspects of the present disclosure.

The coreset configuration 300 may include two or more component coresets such as a first coreset 305, a second coreset 310, and a third coreset 315. Each component coreset may include a pilot signal portion and a control signal portion. For example, the first coreset 305 includes a first pilot signal portion 320 and a first control signal portion 325, the second coreset 310 includes a second pilot signal portion 330 and a second control signal portion 335, and the third coreset 315 includes a third pilot signal portion 340 and a third control signal portion 345.

A base station (e.g., an eNB or gNB) may transmit information on the control channel in accordance with the coreset configuration 300. For example, the base station may transmit a pilot signal for each component coreset in the pilot signal portion and may include control information for each component coreset in the control signal portion. The pilot signal may be, for example, a DMRS. The control signal portion may be a control channel portion carrying a control channel, for example, a PDCCH. In some examples, the control information may include downlink control information (DCI). In some examples, the control information may include a downlink and/or uplink grant.

In some examples, a set amount of time is reserved for each of the control signal portions 325, 335, 345. In some examples, the same amount of time may be reserved for each of the control signal portions 325, 335, 345, for example a set number of one or more symbols (e.g., symbol periods). For example, five resource blocks may be reserved for each of the control signal portions. In some other examples, differing amounts of time may be reserved for the each of the control signals. For example, four resource blocks may be reserved for the first control signal portion 325, six resource blocks may be reserved for the second control signal portion 335, and eight resource blocks may be reserved for the third control signal portion 345.

In some examples, the base station may not fill each of the control signal portions in a given transmission. For example, the control information for one UE for a transmission may span the entirety of the first control signal portion 325, for another UE one half of the second control signal portion 335, and for yet another UE one fourth of the third control signal portion 345.

A UE may be associated with one or more component coresets in the coreset configuration 300. For example, the UE may be associated with the second coreset 310. The UE may receive information from the base station on the control channel. The UE may ignore the first coreset 305. For example, the UE may not attempt to decode the first control signal portion 325. The UE may then obtain the pilot signal (e.g., the DMRS) from the second pilot signal portion 330. The UE may use the pilot signal to decode the control information in the second control signal portion 335. The control information may include, for example, an uplink grant. The UE may schedule a transmission to the base station based at least in part on the uplink grant. The UE may ignore the third coreset 315.

In some examples, the UE may be associated with two or more of the component coresets. For example, the UE may be associated with both the first coreset 305 and the second coreset 310. The UE may receive information from the base station on the control channel. The UE may then obtain the first pilot signal (e.g., the first DMRS) from the first pilot signal portion 320. The UE may use the first pilot signal to decode the control information in the first control signal portion 325. The control information may include, for example, a first uplink grant. The UE may schedule a transmission to the base station based at least in part on the first uplink grant. The UE may then obtain the second pilot signal (e.g., the DMRS) from the second pilot signal portion 330. The UE may use the second pilot signal to decode the control information in the second control signal portion 335. The control information may include, for example, a second uplink grant. The UE may schedule a transmission to the base station based at least in part on the second uplink grant. The UE may ignore the third coreset 315. For example, the UE may not attempt to decode the third control signal portion 345.

In some examples, a cyclic prefix, or one or more guard intervals, or both, may be used within coreset configuration 300 to assist in frequency domain channel estimation and/or frequency domain equalization. The cyclic prefix or guard intervals in a pilot signal portion may assist with frequency domain channel estimation. For example, a first guard interval may be inserted in the time domain between the first pilot signal portion 320 and the control signal portion 325 for the first coreset. A cyclic prefix or guard intervals in the control signal portion may assist with frequency domain equalization. For example a cyclic prefix or one or more guard intervals may be inserted in control signal portion 325.

Figure 4:
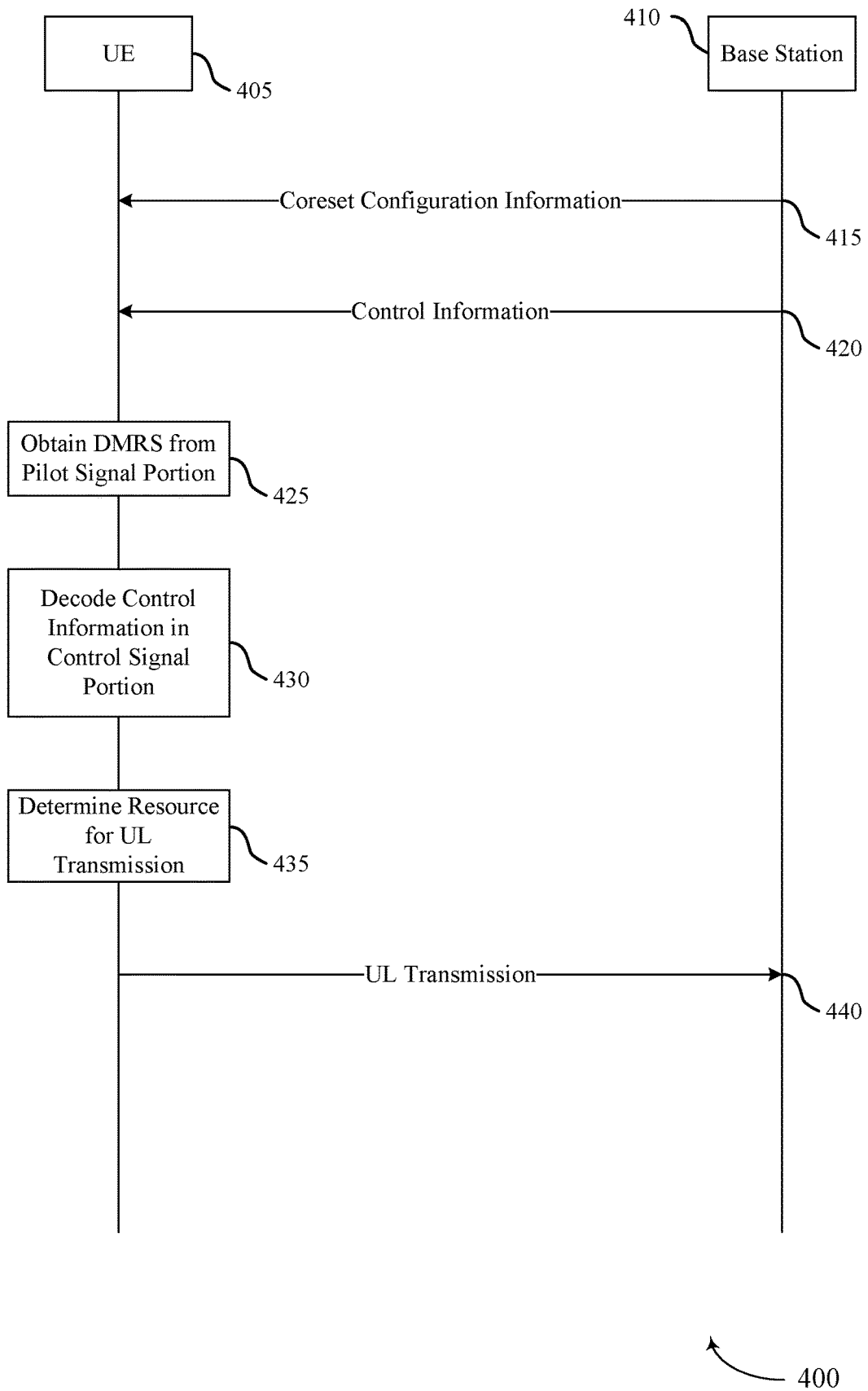
FIG. 4 illustrates an example of a communications flow in a wireless communications system that supports control resource set design under single carrier waveform in accordance with aspects of the present disclosure.

FIG. 4 illustrates an example of a communications flow 400 in a wireless communications system that supports control resource set design under single carrier waveform in accordance with various aspects of the present disclosure. In some examples, the wireless communications system may implement aspects of wireless communications system 100.

The communications flow 400 illustrates communications between a UE 405 and a base station 410. The UE 405 may be an example of aspects of UE 115 as described with reference to FIG. 1. The base station 410 may be an example of aspects of base station 105 as described with reference to FIG. 1.

The base station 410 may transmit coreset configuration information 415 to UE 405. In some examples, the coreset configuration information 415 may include a coreset configuration such as coreset configuration 300 as described with reference to FIG. 3. In some other examples, the coreset configuration information 415 may include an indication (e.g., a reference number or name) of the coreset configuration such as coreset configuration 300 as described with reference to FIG. 3.

The base station 410 may transmit control information 420 to the UE 405. The control information 420 may be transmitted on a control channel such as a physical downlink control channel (PDCCH). The control information 420 may be transmitted in accordance with the coreset configuration 300.

The UE 405 may obtain a pilot signal (e.g., a DMRS) from a pilot signal portion of the control information 420. For example, the UE 405 may be associated with one of the component coresets (e.g., second coreset 310) of the coreset configuration 300. The UE 405 may obtain the pilot signal from the second pilot signal portion 330 of the second coreset 310.

The UE 405 may decode the control information in the control signal portion at 430. For example, the UE 405 may decode the control information from the second control signal portion 335 of the second coreset 310 based at least in part on the pilot signal. The control information may include, for example, an uplink transmission grant.

The UE 405 may determine resources for an uplink transmission based on a grant at 435. The resources for the uplink transmission may be determined based at least in part on the control information 420. For example, the UE 405 may determine the resources for an uplink transmission based at least in part on the decoded uplink transmission grant. The UE 405 may transmit the uplink transmission 440 to the base station based at least in part on the determined resources.

The exemplary coreset configuration 300, which may be used separately or in conjunction with exemplary communications flow 400, may represent an implementation of TDM, multiplexing of pilot signals (e.g., DMRS) and control signals (e.g., PDCCH). The pilot signals may be transmitted in a first symbol, and the control signals in a second symbol, of the single-carrier waveform. This TDM coreset implementation may be relatively straightforward to implement, for example in a SC-QAM system. In some examples, a single transmit beam may be used to transmit each coreset.

The symbol used to transmit the control signal of the coreset may carry one or more DCIs for a UE. That is, the control signal symbol may send multiple DCIs for the same UE in any combination. For example, the control signal symbol may transmit a DL grant and an UL grant. In another example, the control signal symbol may transmit multiple DL grants for the UE, or multiple UL grants for the UE.

To transmit multiple grants to multiple different UEs, a coreset structure may be repeated, for example as shown for coreset configuration 300, and further described above. Such a structure may have less trunking gain for a control signal symbol (e.g., a PDCCH symbol), as each symbol may be associated with a pilot signal (e.g., a DMRS). In some examples, the size of the coreset in time may be based on a worst-case PDCCH size, such that the control symbol may be sized to accommodate the largest possible PDCCH in time, for example for UEs operating using a large PDCCH aggregation level. For UEs operating according to a smaller PDCCH aggregation level, the control region of the coreset may be larger in the time than needed for the control information for such UEs.

Additionally, the coreset size may be constrained in some examples by the type of single-carrier aggregation being used. For example, the coreset size in the time domain may be units of SC-FDM symbols. In other examples, the coreset size in time may be more flexibly allocated by using SC-QAM for the coreset. While the coreset sizes in time have been shown above as non-overlapping, in some examples, coresets may overlap in time and/or be of different sizes in time. For example, differently sized coresets for different types or categories of UEs may be used to more efficiently use time resources in a single-carrier implementation.

Figure 5:
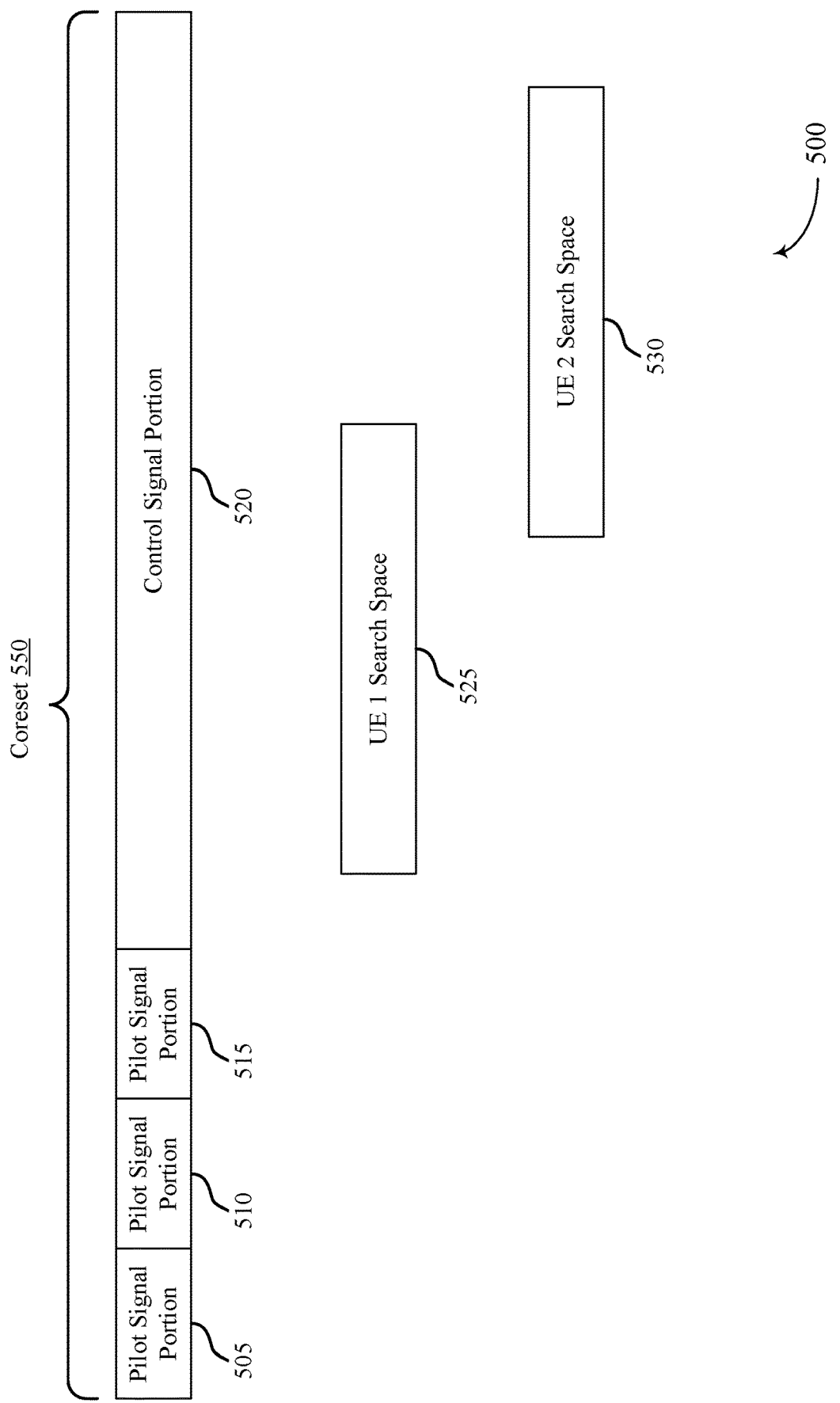
FIG. 5 illustrates an example of a control resource set configuration that supports control resource set design under single carrier waveform in accordance with aspects of the present disclosure.

FIG. 5 illustrates an example of a coreset configuration 500 that supports control resource set design under single carrier waveform in accordance with various aspects of the present disclosure.

The coreset configuration 500 may include a plurality of pilot signal portions corresponding to a plurality of component coresets of a coreset 550. For example, the coreset configuration 500 may include a first pilot signal portion 505 corresponding to a first coreset, a second pilot signal portion 510 corresponding to a second coreset, and a third pilot signal portion 515 corresponding to a third coreset. The pilot signals of the pilot signal portions 505, 510, and/or 515 may be, for example, a DMRS.

The coreset configuration 500 may also include a shared control signal portion 520. The shared control signal portion 520 may include control information (e.g., one or more control signals, such as a PDCCH or other control channel) for one or more of the component coresets. In some examples, the control information may include downlink control information (DCI). In some examples, the control information may include a downlink and/or uplink grant. In some examples, the control information for different UEs (e.g., different coresets) may overlap in the shared control signal portion 520. For example, the shared control signal portion 520 may include control information for a first UE in a first search space 525 and may include control information for a second UE in a second search space 530 that overlaps with the first search space 525.

A UE may be configured to monitor a pilot signal corresponding a coreset associated with the UE. For example, a UE may be associated with a second coreset. The UE may be configured to monitor the second pilot signal portion 510. The UE may then decode the shared control signal portion 520 (or a portion thereof) based at least in part on the second pilot signal portion 510. For example, the UE may determine a channel estimate based at least in part on the second pilot signal portion 510, and may decode the shared control signal portion 520 based at least in part on the channel estimate.

In some examples, the UE may support decoding using more than one pilot signal. For example, the UE may be associated with both the first coreset and the second coreset. Accordingly, the UE may be configured to monitor the first pilot signal portion 505 and the second pilot signal portion 510. The UE may perform channel estimation based at least in part on the first pilot signal portion 505 and the second pilot signal portion 510. The UE may determine which of the first pilot signal portion 505 and the second pilot signal portion 510 may have a DMRS transmission based at least in part on the channel estimation.

In some examples, the UE may determine that both the first pilot signal portion 505 and the second pilot signal portion 510 may have a DMRS transmission. The UE may decode the shared control signal portion 520 based at least in part on the first pilot signal portion 505, and may separately decode the shared control signal portion 520 based at least in part on the second pilot signal portion 510.

In some other examples, the UE may determine that first pilot signal portion 505 but not the second pilot signal portion 510 may have a DMRS transmission based at least in part on the channel estimate. For example, the base station may not include a DMRS in the second pilot signal portion 510 because no control information for the second coreset is included in the shared control signal portion. The UE may decode the shared control signal portion 520 based at least in part on the first pilot signal portion 505, but may not decode the shared control signal portion 520 based at least in part on the second pilot signal portion.

Coreset 550 may in some examples be transmitted in a single beam, or may be transmitted in multiple beams simultaneously. In other examples, multiple beams may be used to transmit different symbols of coreset 550. For example pilot signal portion 505 may be transmitted using a first transmit beam, and pilot signal portion 510 may be transmitted using a second transmit beam, and so on according to various combinations. In some examples, a joint channel estimation may be performed for one or more pilot regions.

A coreset configuration 500 that includes distinct pilot signal portions and a shared or common control signal portion 520 may introduce additional flexibility in the system through pooling. Coreset configuration 500 may also provide additional power savings for UEs configured with such coresets. For example, the UE may wake up during its associated pilot signal portion and for the associated processing.

In addition, as another benefit of a shared control channel region, because the control signal portion is shared, it can be shared at a finer time resolution as compared to an OFDM symbol level. For example coreset configuration 300 includes control signal portion 325, control signal portion 335, and control signal portion 345 for single UEs, such that unneeded or excess time resources of one control channel portion (e.g., control signal portion 325) cannot be shared with a second UE. Put differently, a coreset configuration 300 for three UEs, for the same amount of control information for the three UEs, may need to dedicate a greater amount of time resources (the total time resources of control signal portion 325, control signal portion 335, and control signal portion 345) than the total amount of time resources of the shared or common control signal portion 520 of coreset configuration 500 for the same control information for the same three UEs.

In some examples, the trunking gain for a shared or common control signal portion 520 may be increased relative to a number of TDM control signal portions. For TDM, the time resource size of the common control signal portion may be determined according to a number of time resources needed for the control signal portion of the lowest geometry UE. For example, if the worst case scenario is that a UE may need 8 CCEs, 24 CCEs may need to be reserved to accommodate three control signals (e.g., three PDCCHs). In some cases, a UE may utilize less than the 8 CCEs (e.g., it may utilize only one of the eight CCEs), but other UEs may not transmit in the remaining portion of the 8 CCEs. In contrast, by using a shared control region, multiple control signals (e.g., multiple PDCCHs) may be transmitted at the same time. For example, if the size of a common control region is 16 CCEs, a first UE may transmit using 8 CCEs of the shared control region, a second UE may transmit using 4 CCEs of the shared control region, and a third UE may transmit using 4 CCEs of the shared control region.

In other examples, the one or more pilot regions of a coreset may be front loaded and/or continuous in the coreset, for example as illustrated for coreset 550 for pilot signal portion 505, pilot signal portion 510, and pilot signal portion 515. Front loading of a pilot region may allow for earlier channel estimation and less beam switching in the coreset. In other example, the pilot region of the coreset may be located within the coreset 550, such that no edge of a pilot signal region is at the edge of the coreset. Put differently, the control channel regions (e.g., shared or common control signal portion 520, which may be a shared PDCCH region) may be on either side of the pilot region in the coreset, both before and after the control channel regions. The middle location for the pilot regions may provide better channel estimation in some cases, for example, for higher Doppler channels. In other examples, the locations of the pilot signal regions may be spread throughout the coreset, such that the pilot signal regions are not contiguous within the coreset.

In some examples, a cyclic prefix, or one or more guard intervals, or both, may be used within coreset configuration 500 to assist in frequency domain channel estimation and/or frequency domain equalization. The cyclic prefix or guard intervals in the pilot signal portion may assist with frequency domain channel estimation. For example, a first guard interval may be inserted in the time domain between the first pilot signal portion 505 and the second pilot signal portion 510, and a second guard interval may be inserted in the time domain between the second pilot signal portion 510 and the third pilot signal portion 515. For example, a first guard interval may be inserted in the time domain between the first pilot signal portion 505 and the second pilot signal portion 510, and a second guard interval may be inserted in the time domain between the second pilot signal portion 510 and the third pilot signal portion 515. A cyclic prefix or guard intervals in the shared or common control signal portion 520 may assist with frequency domain equalization.

Figure 6:
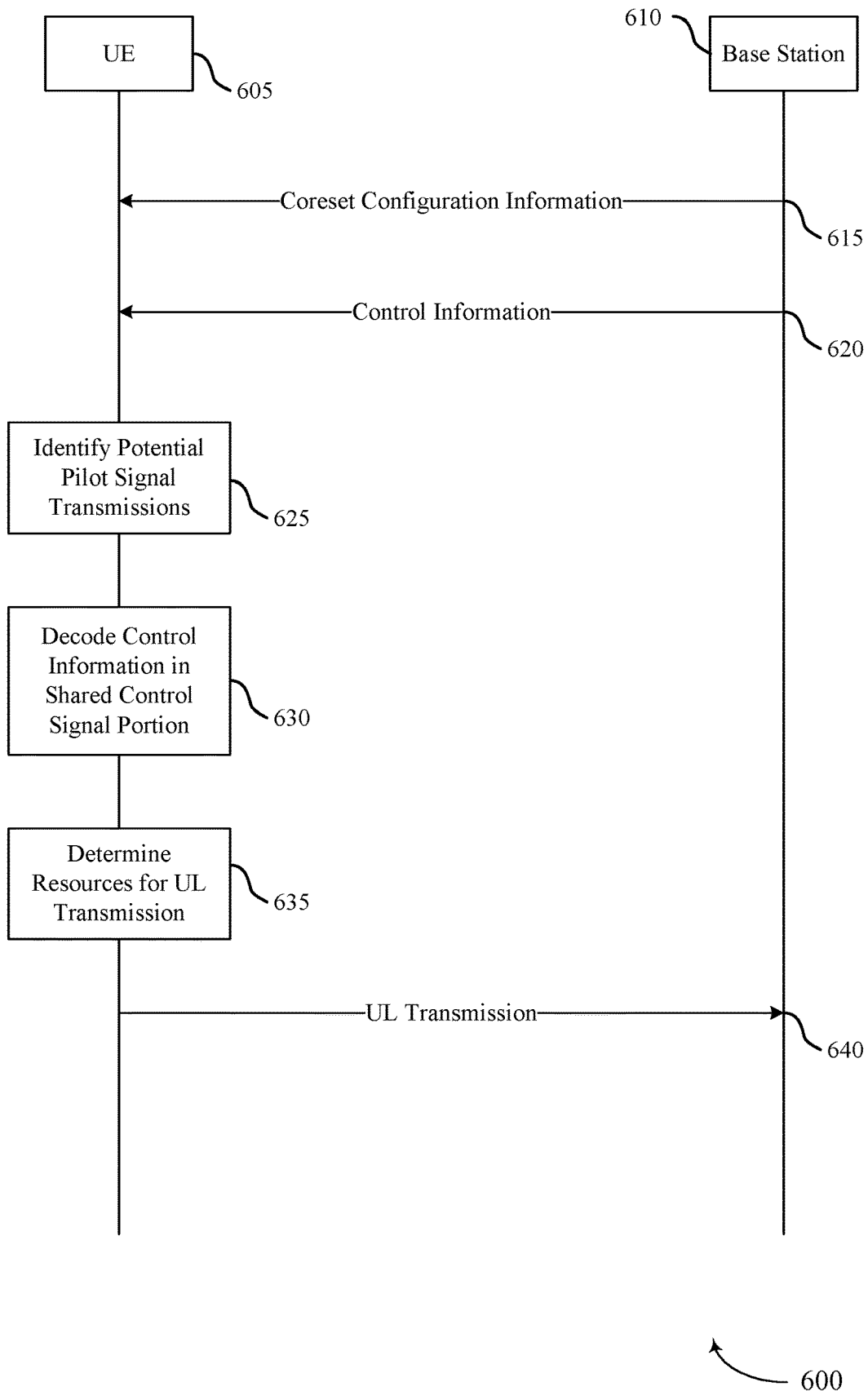
FIG. 6 illustrates an example of a communications flow in a wireless communications system that supports control resource set design under single carrier waveform in accordance with aspects of the present disclosure.

FIG. 6 illustrates an example of a communications flow 600 in a wireless communications system that supports control resource set design under single carrier waveform in accordance with various aspects of the present disclosure. In some examples, the wireless communications system may implement aspects of wireless communications system 100.

The communications flow 600 illustrates communications between a UE 605 and a base station 610. The UE 605 may be an example of aspects of UE 115 as described with reference to FIG. 1. The base station 610 may be an example of aspects of base station 105 as described with reference to FIG. 1.

The base station 610 may transmit coreset configuration information 615 to UE 605. In some examples, the coreset configuration information 615 may include a coreset configuration such as coreset configuration 500 as described with reference to FIG. 5. In some other examples, the coreset configuration information 615 may include an indication (e.g., a reference number or name) of the coreset configuration such as coreset configuration 500 as described with reference to FIG. 5.

The base station 610 may transmit control information 620 to the UE 605. The control information 620 may be transmitted on a control channel, such as a physical downlink control channel (PDCCH). The control information 620 may be transmitted in accordance with the coreset configuration 500.

The UE 605 may identify potential pilot signal transmissions at 625 (e.g., identify a DMRS transmission). For example, the UE 605 may be configured to monitor one or more of the pilot signal portions in the coreset configuration 500. In some examples, pilot signal transmissions may be transmitted using multiple transmit beams by base station 610, for example one pilot signal transmission per transmit beam. The UE 605 may determine a channel estimate for each of the one or more pilot signal portions, and determine whether each of the pilot signal portions includes a potential pilot signal transmission based at least in part on the channel estimates.

The UE 605 may decode the control information in the shared control signal portion at 630. For example, the UE 605 may decode (e.g., using blind decoding) the shared control signal portion separately for each of the potential pilot signal transmissions identified at 625. The control information may include, for example, an uplink transmission grant. In some examples, the UE may be configured to monitor for a particular one (or more) of the pilot signal transmissions of the control information 620. Based on the pilot signal transmission, the UE 605 may attempt to decode control information in the entire control signal portion of the coreset (e.g., shared or common control signal portion 520, which may be a shared PDCCH region, as described with reference to FIG. 5). Such a coreset configuration may prevent the multiplexing of multiple UEs that monitor the same pilot signals, thus constraining some system flexibility.

The UE 605 may also be configured, for example through a system information transmission, to support decoding using multiple different pilot signals (e.g., different DMRSs). For example, UE 605 may be configured to monitor a certain subset (e.g., Y of X symbols, where Y is less than or equal to X) of a total number of pilot signal symbols, such that base station 610 may be constrained to transmit pilot signal symbols in this certain subset of pilot signal symbols for the UE 605. In such a case, UE 605 will attempt to decode the pilot signal symbols (e.g., Y symbols) at those locations and attempt channel estimation. Based on the channel estimation, UE 605 may determine that some subset of the pilot signal symbols (e.g., Z of Y symbols, where Z is less than or equal to Y) may contain potential pilot signal transmissions from base station 610 for UE 605. UE 605 may then perform control signal (e.g., PDCCH) blind detection Z times in the control (e.g., or PDCCH) region using one of the Z channel estimates.

The UE 605 may determine resources for an uplink transmission based on a grant at 635. The resources may be determined based at least in part on the control information 620. For example, the UE 605 may determine the resources for an uplink transmission based at least in part on the decoded uplink transmission grant. The UE 605 may transmit the uplink transmission 640 to the base station based at least in part on the determined resources.

Figure 7:
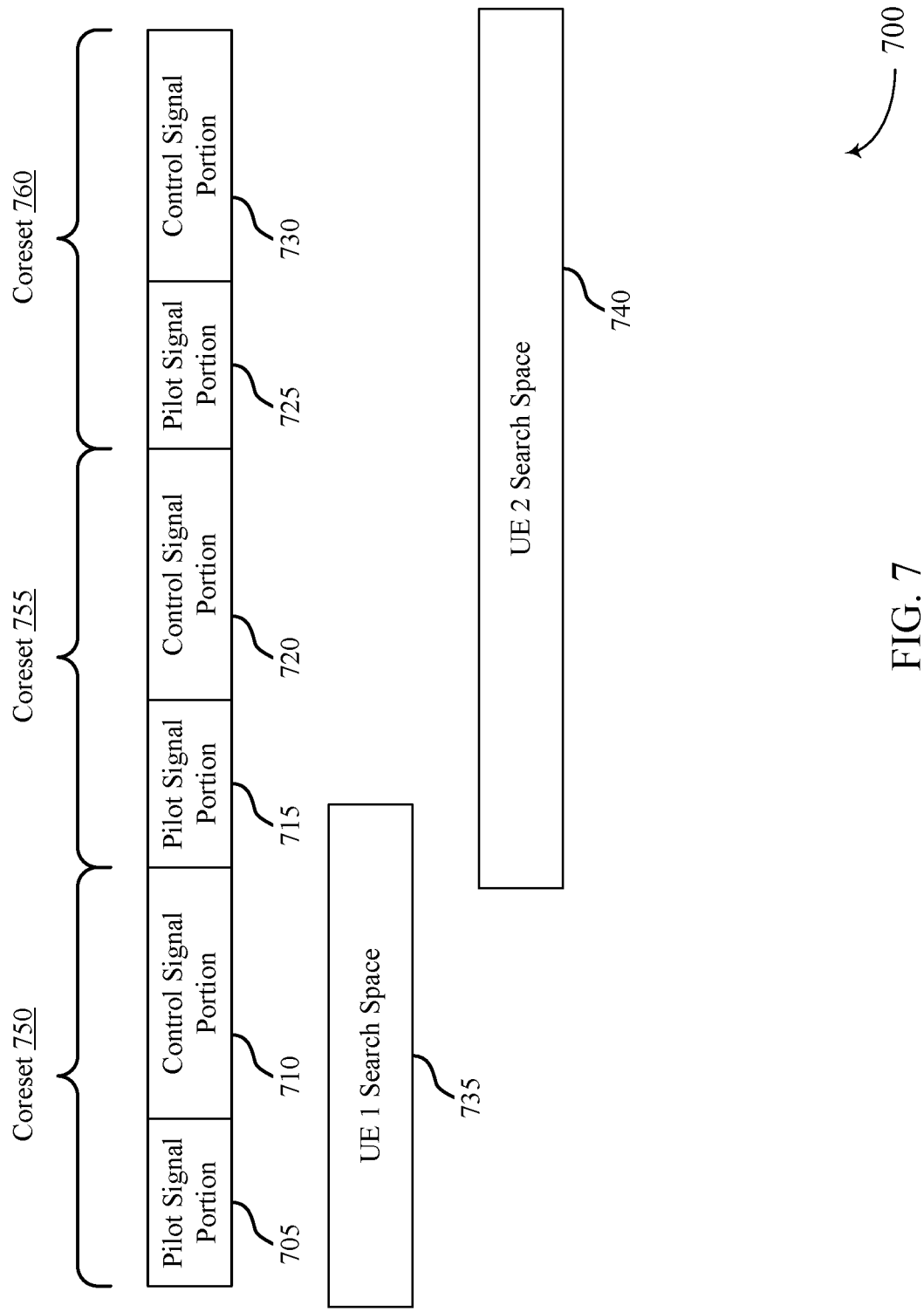
FIG. 7 illustrates an example of a control resource set configuration that supports control resource set design under single carrier waveform in accordance with aspects of the present disclosure.

FIG. 7 illustrates an example of a coreset configuration 700 that supports control resource set design under single carrier waveform in accordance with various aspects of the present disclosure.

The coreset configuration 700 may include a plurality of pilot regions corresponding to a plurality of control region groups. For example, the coreset configuration 700 may include a first pilot region 705 corresponding to a first control signal portion 710 (a first control channel region) making up a coreset 750, a second pilot region 715 corresponding to a second control signal portion 720 (a second control channel region) making up a coreset 755, and a third pilot region 725 corresponding to a third control signal portion 730 (a third control channel region) making up a coreset 760. The pilot signal may be, for example, a DMRS.

Each pilot region 705, 715, 725 may include control signals for one or more UEs and one or more coresets, for example in a control channel (e.g., a PDCCH). In some examples, two or more pilot regions may include control signals for a UE or coreset. For example, the first pilot region 705 may include control signals for a first coreset at a first UE, the second pilot region 715 may include control signals for a second coreset at a second UE, and the third pilot region 725 may include control signals for the second coreset at the second UE. In this manner, control signals for a coreset for a UE may be transmitted across two or more groups of REs.

In some examples, the resource elements (REs) may be grouped into groups of REs based at least in part on a control channel element (CCE). For example, each control region group may be a size of one CCE, or the control region group may be of a size of two CCEs. Where the control region group is of a size of one CCE, there may be higher pilot overhead than where the control region group is of a size of two CCEs. A transmit beam for the control region group of a size of two CCEs for a first UE may be able to be multiplexed with the transmit beam for the control region group of one CCE for a second UE, and it may hence accommodate one or more control signals spanning any number of CEs without wasting resources apart from the pilot overhead. However, when a control region group is a size of two CCEs and the control message requires only one CCE, the second CCE may not be usable for a control transmission and therefore may be wasted.

In some examples, the control region group may include downlink control information (DCI). In some examples, the control region group may include a downlink and/or uplink grant.

A UE may be configured to monitor all pilot regions in the coreset configuration 700 in order to identify pilot signals corresponding a coreset associated with the UE. For example, a UE may be associated with a second coreset. The UE may be configured to monitor the first pilot region 705. The UE may determine that a pilot signal in the first pilot region 705 does not correspond to the second coreset, and may not decode the control signals in the first control signal portion 710 (a first control channel region).

The UE may be configured to monitor the second pilot region 715. The UE may determine that a pilot signal in the second pilot region 715 corresponds to the second coreset, and may decode the control signals in the second control signal portion 720 (second control channel region) based at least in part on the pilot signals in the second pilot region 715. For example, the UE may determine a channel estimate based at least in part on the pilot signal in the second pilot region 715, and may decode the control signals in the second control signal portion 720 (second control channel region) based at least in part on the channel estimate.

The UE may be configured to monitor the third pilot region 725. The UE may determine that a pilot signal in the third pilot region 725 corresponds to the second coreset, and may decode the control signals in the third control signal portion 730 (third control channel region) based at least in part on the pilot signals in the third pilot region 725. For example, the UE may determine a channel estimate based at least in part on the pilot signal in the third pilot region 725, and may decode the control signals in the third control signal portion 730 (third control channel region) based at least in part on the channel estimate.

In some examples, when two or more pilot regions contain pilot signals corresponding to a coreset (e.g., for aggregation levels spanning more than one group of resource elements), the UE may decode the corresponding control signals based at least in part on both pilot signals. For example, the UE may determine a combined (e.g., average) channel estimate based on the pilot signal in the second pilot region 715 and a third pilot region 725 (e.g., by averaging the independent channel estimates). The UE may then decode the control signals in both the second control signal portion 720 and the third control signal portion 730 based at least in part on the combined (e.g., average) channel estimate.

In some examples, a first UE may be configured with a first search space 735 and a second UE may be configured with a second search space 740 (e.g., based on search space configuration information received from a base station). Search space configurations may be used to limit the number of pilot regions that the UE must monitor in the coreset configuration 700. The first search space 735 may span a first coreset 750. The base station may be configured to transmit control signals for the first UE in the first coreset only. The first UE may be configured to monitor the first pilot region 705 and decode the control signals in the first control signal portion 710.

The second search space 740 may span a second coreset 755 and a third coreset 760. The second UE may be configured to monitor the second pilot region 715 and the third pilot region 725, and decode control signals in the second control signal portion 720 and the third control signal portion 730. In some examples, the second UE may decode the control signals in the second control signal portion 720 based at least in part on the pilot signals in the second pilot region 715, and may decode the control signals in the third control signal portion 730 based at least in part on the pilot signals in the third pilot region 725. In some other examples, the second UE may decode control signals in the second control signal portion 720 and the third control signal portion 730 based at least in part on an average of the channel estimates based on pilot signals in the second pilot region 715 and the third pilot region 725.

In some examples, the pilot region and control region group for a particular coreset may be continuous in time, as shown in FIGS. 3, 5, and 7. In some other examples, the pilot region and control region group for a particular coreset may be distributed in a non-continuous fashion in the available time resources. Spreading out the pilot region and control region group may improve frequency offset estimation and interference estimation. In some cases, transmit beams from neighboring cells may be changing over time, such that the distribution of pilot signal regions in time across the coreset configuration may improve the accuracy of the interference that is estimated.

In some examples, the resource elements comprising the control region group may be contiguous or non-contiguous. The control region group may be spread in time across the time resources of the coreset configuration 700.

In some examples, a time gap (e.g., a guard interval) may be provided between coresets, between the pilot region and the control region group, or between PDCCH regions for different UEs. During the time gap, a base station may change a beam configuration, a bandwidth configuration, a center frequency of the transmission, or a combination thereof. For example, a first pilot signal may be transmitted using a first bandwidth in pilot region 705, and a second pilot signal may be transmitted using a second bandwidth in pilot region 715. A first control signal (e.g., a first PDCCH) corresponding to the first pilot signal may be transmitted using the first bandwidth in control signal portion 710, while a second control signal (e.g., a second PDCCH) corresponding to the second pilot signal may be transmitted using the second bandwidth in control signal portion 720. In such case, a time gap or guard interval to allow the base station to switch beams may thus be used, for example between control signal portion 710 and pilot region 715. In another example, different UEs may have different bandwidth capability and may be configured to operate with different center frequencies for control signal (e.g., PDCCH) and/or data signal (e.g., PDSCH) monitoring. Thus, a base station transmitting a coreset according to a coreset configuration may change the bandwidth and/or center frequency dynamically while transmitting the coreset.

In some examples, an antenna subarray may be used to transmit pilot signals (e.g., DMRSs) in different directions. Such transmissions may use some of the same techniques used for MU-MIMO transmissions. The antenna subarray may have a power amplifier separately associated with each antenna element of the subarray. The pilot signals may be multiplexed on the same tones orthogonally, for example using CDM. Such configuration may lose some peak array gain for the pilot signals relative to not transmitting in different directions, but may still be sufficient to allow for control signal (e.g., PDCCH) decoding. In some examples, the pilot signals may be transmitted in different directions (e.g., according to a MU-MIMO transmission mode for two or more UEs) for a coreset, while the control signal data tones may use TDM for the coreset.

Figure 8:
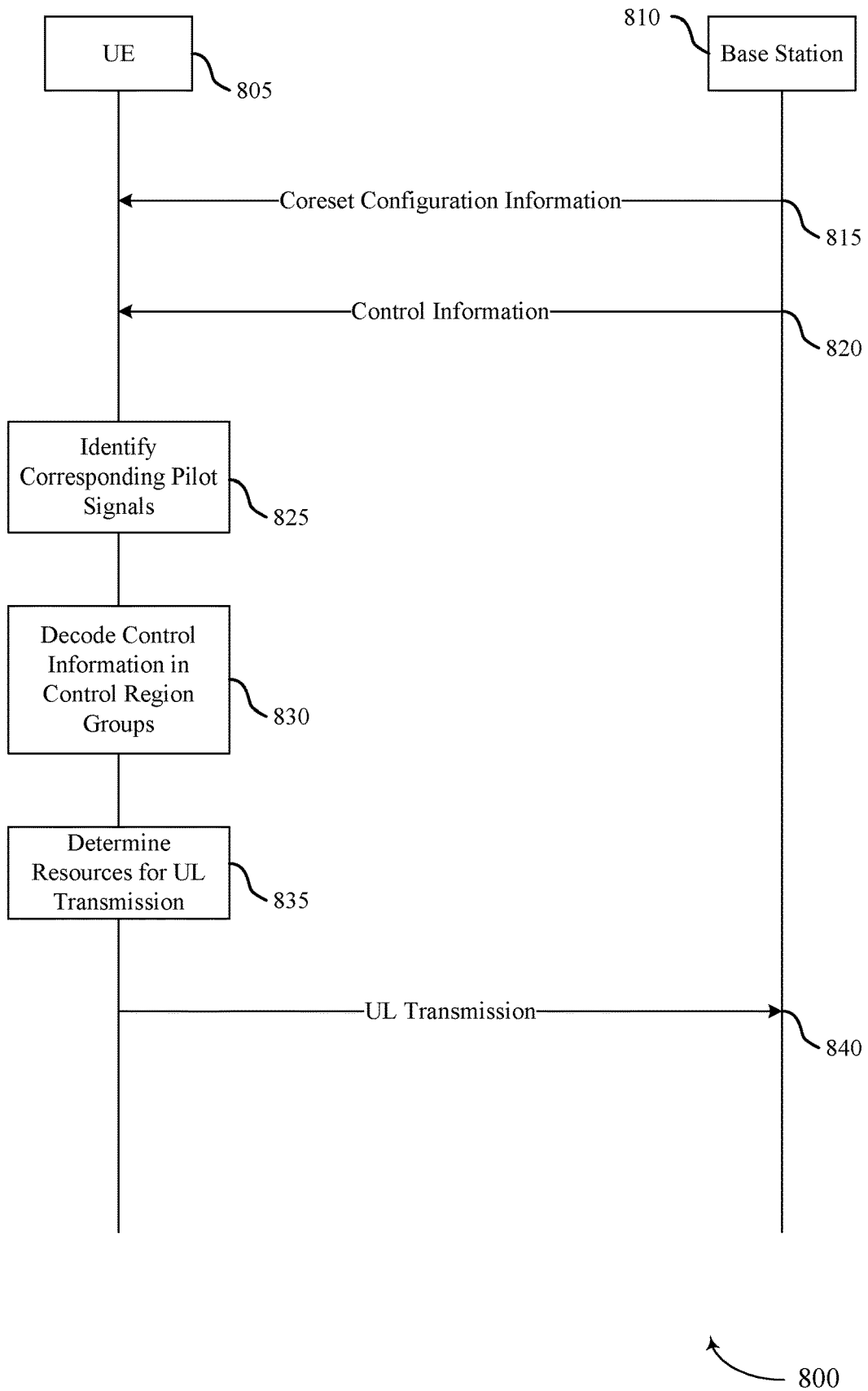
FIG. 8 illustrates an example of a communications flow in a wireless communications system that supports control resource set design under single carrier waveform in accordance with aspects of the present disclosure.

FIG. 8 illustrates an example of a communications flow 800 in a wireless communications system that supports control resource set design under single carrier waveform in accordance with various aspects of the present disclosure. In some examples, the wireless communications system may implement aspects of wireless communications system 100.

The communications flow 800 illustrates communications between a UE 805 and a base station 810. The UE 805 may be an example of aspects of UE 115 as described with reference to FIG. 1. The base station 810 may be an example of aspects of base station 105 as described with reference to FIG. 1.

The base station 810 may transmit coreset configuration information 815 to UE 805. In some examples, the coreset configuration information 815 may include a coreset configuration such as coreset configuration 700 as described with reference to FIG. 7. In some other examples, the coreset configuration information 815 may include an indication (e.g., a reference number or name) of the coreset configuration such as coreset configuration 700 as described with reference to FIG. 7. In some examples, the coreset configuration information 815 may also include search space configuration information.

The base station 810 may transmit control information 820 to the UE 805. The control information 820 may be transmitted on a control channel such as a physical downlink control channel (PDCCH). The control information 820 may be transmitted in accordance with the coreset configuration 700.

The UE 805 may identify pilot signals corresponding to a coreset for the UE 805 (e.g., coreset A) at 825. For example, the UE 805 may be configured to monitor each of the pilot regions in the coreset configuration 700. The UE 805 determine whether each of the pilot regions correspond to coreset A. For example, the UE 805 may determine that the pilot signal in a pilot region (e.g., a second pilot region 715) corresponds to coreset A. In some examples, the UE 805 may identify corresponding pilot signals (pilot signals that correspond to coreset A) in two or more of the pilot regions (e.g., in the second pilot region 715 and the third pilot region 725). In some other examples, the UE 805 may be configured to monitor a subset of the pilot regions in the coreset configuration 700 based at least in part on search space configuration information.

The UE 805 may decode the control information in the control region groups corresponding to the identified pilot signals at 830. For example, the UE 805 may determine a channel estimate based at least in part on an identified pilot signal (e.g., the pilot signal in second pilot region 715), and decode the control information in the corresponding control region group (e.g., control signal portion 720) based at least in part on the channel estimate. In some examples, the UE 805 may determine a combined (e.g., average) channel estimate based at least in part on two or more of the identified pilot signals (e.g., by averaging the independent channel estimates). For example, the UE 805 may determine a first channel estimate based on the pilot signal in the second pilot region 715, determine a second channel estimate based on the pilot signal in the third pilot region 725, determine an average channel estimate based on the first channel estimate and the second channel estimate, and decode the control information in the second control signal portion 720 and the third control signal portion 730 based at least in part on the average channel estimate. The control information may include, for example, an uplink transmission grant.

The UE 805 may determine resources for an uplink transmission based on a grant at 835. The resources for the uplink transmission may be determined based at least in part on the control information 820. For example, the UE 805 may determine the resources for an uplink transmission based at least in part on the decoded uplink transmission grant. The base station 810 may transmit the uplink transmission 840 to the base station based at least in part on the determined resources.

Figure 9:
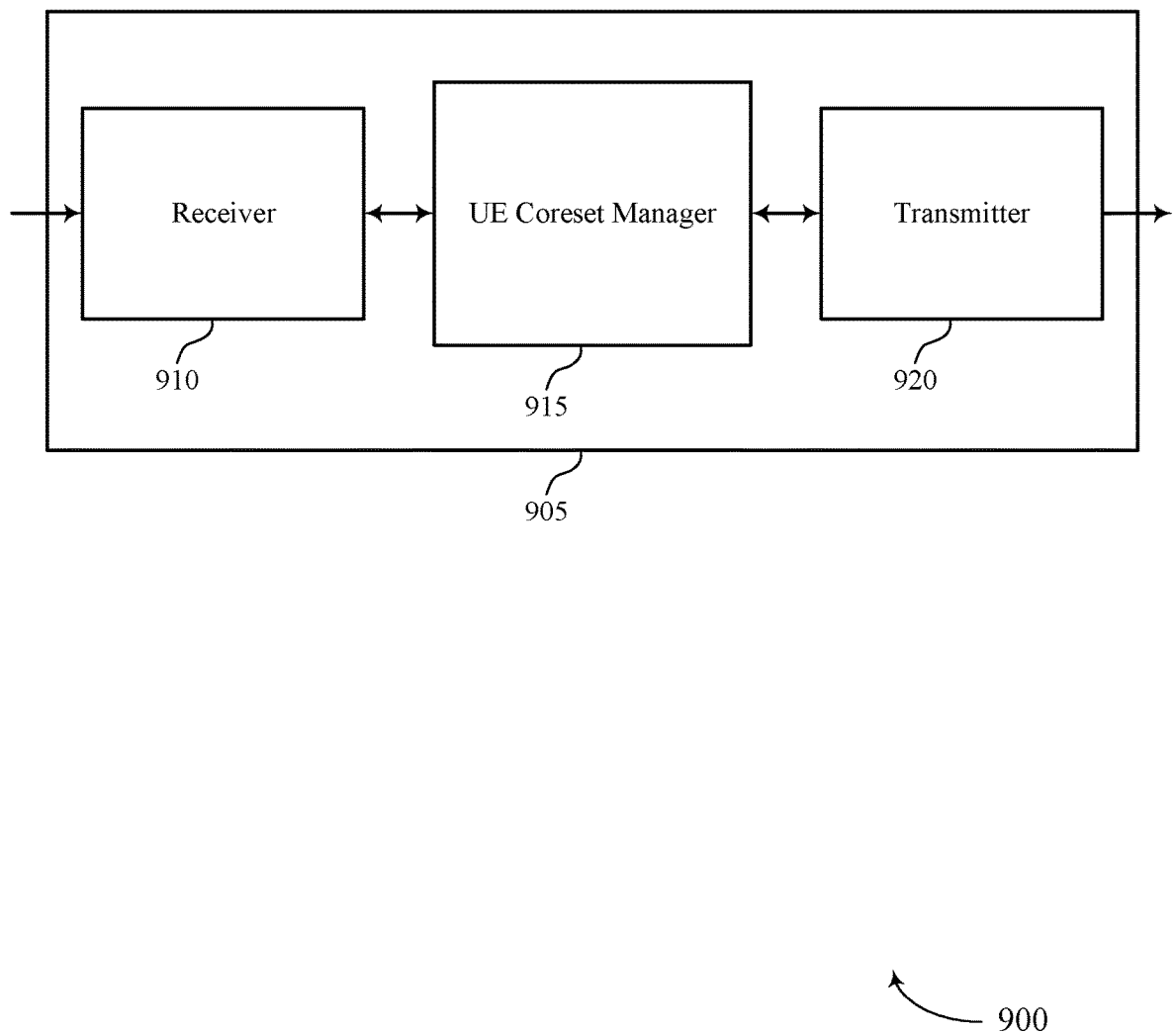
FIGS. 9 through 11 show block diagrams of a device that supports control resource set design under single carrier waveform in accordance with aspects of the present disclosure.

FIG. 9 shows a block diagram 900 of a wireless device 905 that supports control resource set design under single carrier waveform in accordance with aspects of the present disclosure. Wireless device 905 may be an example of aspects of a user equipment (UE) 115 as described herein. Wireless device 905 may include receiver 910, UE coreset manager 915, and transmitter 920. Wireless device 905 may also include a processor. Each of these components may be in communication with one another (e.g., via one or more buses).

Receiver 910 may receive information such as packets, user data, or control information corresponding with various information channels (e.g., control channels, data channels, and information related to control resource set design under single carrier waveform, etc.). Information may be passed on to other components of the device. The receiver 910 may be an example of aspects of the transceiver 1235 described with reference to FIG. 12. The receiver 910 may utilize a single antenna or a set of antennas.

UE coreset manager 915 may be an example of aspects of the UE coreset manager 1215 described with reference to FIG. 12.

UE coreset manager 915 and/or at least some of its various sub-components may be implemented in hardware, software executed by a processor, firmware, or any combination thereof. If implemented in software executed by a processor, the functions of the UE coreset manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE coreset manager 915 and/or at least some of its various sub-components may be physically located at various positions, including being distributed such that portions of functions are implemented at different physical locations by one or more physical devices. In some examples, UE coreset manager 915 and/or at least some of its various sub-components may be a separate and distinct component in accordance with various aspects of the present disclosure. In other examples, UE coreset manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE coreset manager 915 may receive an indication of a configuration for a control resource set used for a single carrier waveform transmission, the control resource set including one or more pilot regions and one or more control channel regions corresponding to the one or more pilot regions, the one or more pilot regions and the one or more control channel regions spanning a bandwidth of the single carrier waveform transmission, monitor, based on the identified configuration, a first pilot region of the one or more pilot regions of the control resource set for a pilot signal for the UE, and decode, based on the pilot signal, a control channel signal for the UE received in a first control channel region of the one or more control channel regions of the control resource set.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
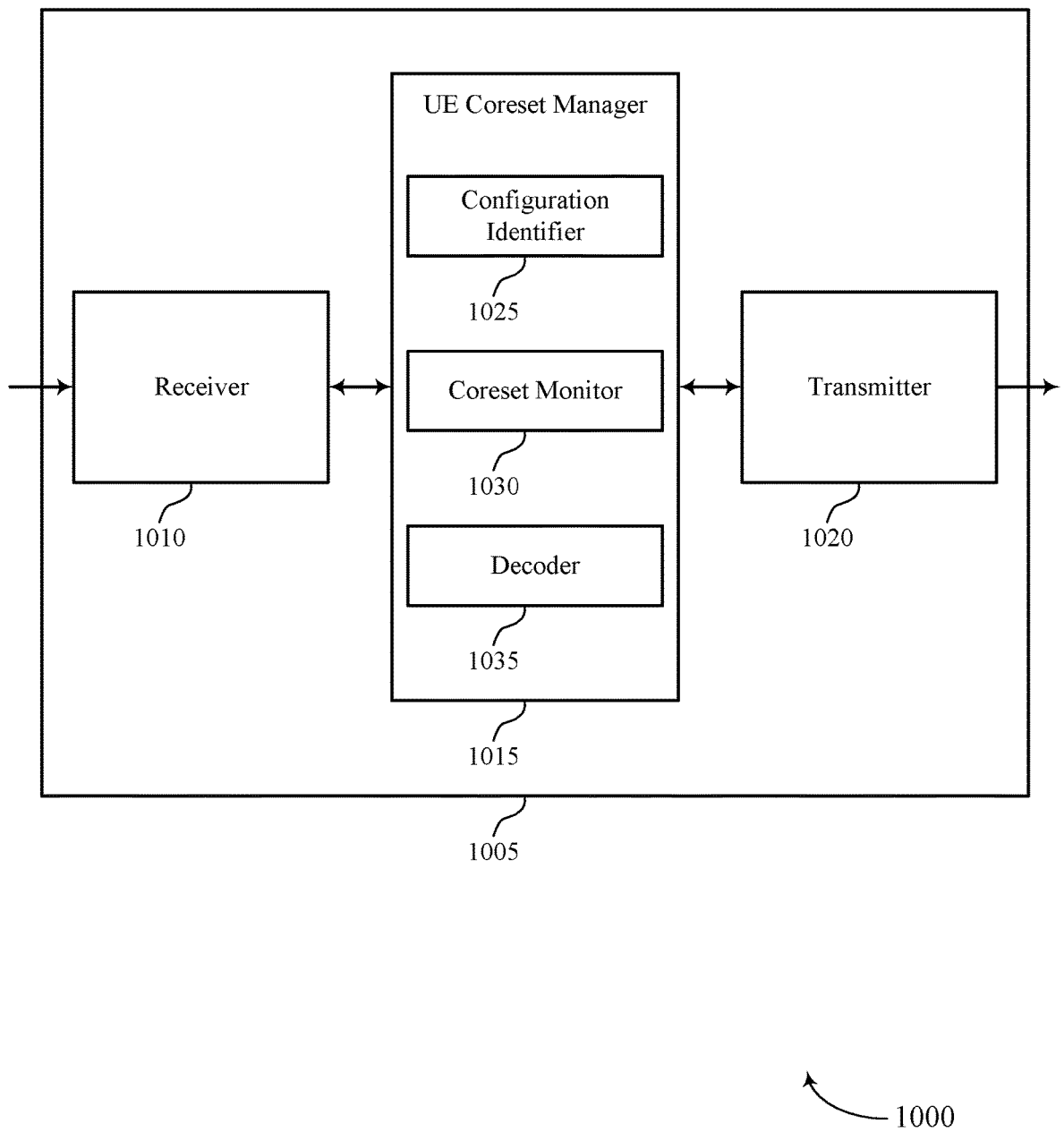

FIG. 10 shows a block diagram 1000 of a wireless device 1005 that supports control resource set design under single carrier waveform in accordance with aspects of the present disclosure. Wireless device 1005 may be an example of aspects of a wireless device 905 or a UE 115 as described with reference to FIG. 9. Wireless device 1005 may include receiver 1010, UE coreset manager 1015, and transmitter 1020. Wireless device 1005 may also include a processor. Each of these components may be in communication with one another (e.g., via one or more buses).

Receiver 1010 may receive information such as packets, user data, or control information corresponding with various information channels (e.g., control channels, data channels, and information related to control resource set design under single carrier waveform, etc.). Information may be passed on to other components of the device. The receiver 1010 may be an example of aspects of the transceiver 1235 described with reference to FIG. 12. The receiver 1010 may utilize a single antenna or a set of antennas.

UE coreset manager 1015 may be an example of aspects of the UE coreset manager 1215 described with reference to FIG. 12.

UE coreset manager 1015 may also include configuration identifier 1025, coreset monitor 1030, and decoder 1035.

Configuration identifier 1025 may receive an indication of a configuration for a control resource set used for a single carrier waveform transmission, the control resource set including one or more pilot regions and one or more control channel regions corresponding to the one or more pilot regions, the one or more pilot regions and the one or more control channel regions spanning a bandwidth of the single carrier waveform transmission, identify a set of pilot regions for a set of control resource sets, receive, from a base station, an identification of the subset of the set of pilot regions for the UE to monitor, and receive, from a base station, an indication of the configuration for the control resource set. In some cases, the identified configuration for the control resource set includes a first control region group including the first pilot region and the first control channel region. In some cases, a second control region group including the second pilot region and the second control channel region. In some cases, first time resources for the control resource set are of a different size, or overlap at least in part with, or a combination thereof, than second time resources for a second control resource set. In some cases, a bandwidth of a single carrier waveform transmission for the first pilot region and the first control channel region is different than a bandwidth of a single carrier waveform transmission for a second pilot region of the one or more pilot regions and a second control channel region of the one or more control channel regions.

Coreset monitor 1030 may monitor, based on the identified configuration, a first pilot region of the one or more pilot regions of the control resource set for a pilot signal for the UE, monitor the shared control channel region of the control resource set for the control channel signal for the UE, monitor, based on the identified configuration, a second pilot region of the one or more pilot regions for a second pilot signal for the UE, and monitor a subset of the set of pilot regions for the pilot signal for the UE. In some cases, pilot signals in different pilot regions of the one or more pilot regions are transmitted using different beams. In some cases, the one or more control channel regions are non-overlapping. In some cases, each one of the one or more control channel regions corresponds to one of the one or more pilot regions, the one of the one or more control channel regions and the corresponding one of the one or more pilot regions corresponding to a same transmission beam. In some cases, the control channel signal is restricted by the configuration to be transmitted within one of the one or more control channel regions. In some cases, the UE is configured to monitor only one of the one or more control channel regions for control channel signals. In some cases, the control channel signal spans at least two of the one or more control channel regions. In some cases, monitoring for the pilot signal includes monitoring, based on the identified configuration, the one or more pilot regions of the control resource set for the pilot signal for the UE, each of the one or more pilot regions time division multiplexed with a corresponding one of the one or more control channel regions. In some cases, the control channel signal in the first control channel region includes a first portion of a control channel transmission for the UE. In some cases, the pilot signal includes a demodulation reference signal (DMRS). In some cases, monitoring for the pilot signal includes monitoring, based on the identified configuration, the one or more pilot regions of the control resource set for the pilot signal for the UE, the one or more pilot regions including a set of time division multiplexed pilot regions for a set of UEs.

Decoder 1035 may decode, based on the pilot signal, a control channel signal for the UE received in a first control channel region of the one or more control channel regions of the control resource set, decode, based on second pilot signal, a control channel signal for the UE received in a second control channel region of the one or more control channel regions of the control resource set, and decode the control channel signal based on the channel estimate. In some cases, the control channel signal includes downlink control information, or an uplink grant, or a downlink grant, or a combination thereof. In some cases, the control channel signal includes a physical downlink control channel (PDCCH).

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
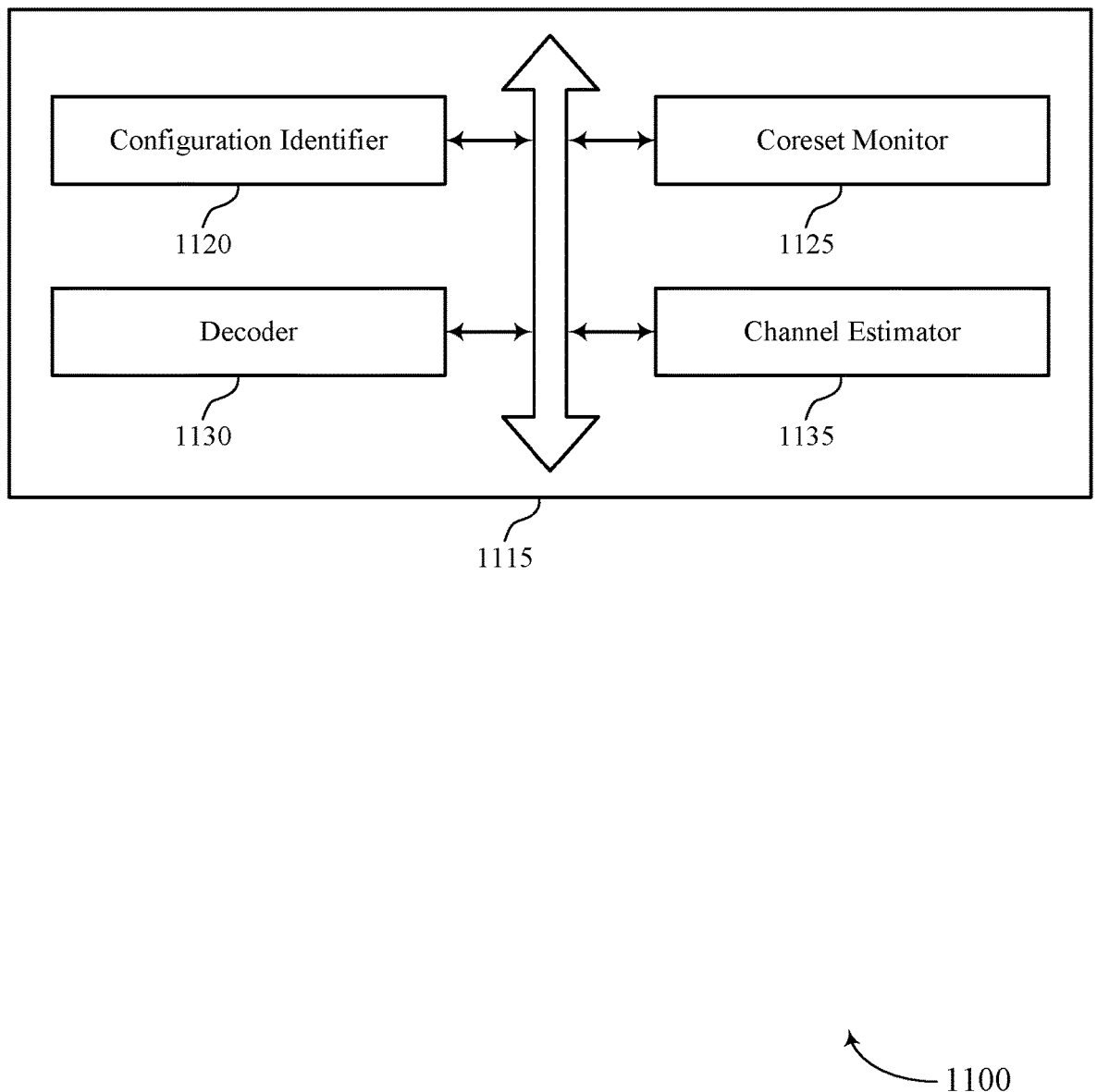

FIG. 11 shows a block diagram 1100 of a UE coreset manager 1115 that supports control resource set design under single carrier waveform in accordance with aspects of the present disclosure. The UE coreset manager 1115 may be an example of aspects of a UE coreset manager 915, a UE coreset manager 1015, or a UE coreset manager 1215 described with reference to FIGS. 9, 10, and 12. The UE coreset manager 1115 may include configuration identifier 1120, coreset monitor 1125, decoder 1130, and channel estimator 1135. Each of these modules may communicate, directly or indirectly, with one another (e.g., via one or more buses).

Configuration identifier 1120 may receive an indication of a configuration for a control resource set used for a single carrier waveform transmission, the control resource set including one or more pilot regions and one or more control channel regions corresponding to the one or more pilot regions, the one or more pilot regions and the one or more control channel regions spanning a bandwidth of the single carrier waveform transmission, identify a set of pilot regions for a set of control resource sets, receive, from a base station, an identification of the subset of the set of pilot regions for the UE to monitor, and receive, from a base station, an indication of the configuration for the control resource set. In some cases, the identified configuration for the control resource set includes a first control region group including the first pilot region and the first control channel region. In some cases, a second control region group including the second pilot region and the second control channel region. In some cases, first time resources for the control resource set are of a different size, or overlap at least in part with, or a combination thereof, than second time resources for a second control resource set. In some cases, a bandwidth of a single carrier waveform transmission for the first pilot region and the first control channel region is different than a bandwidth of a single carrier waveform transmission for a second pilot region of the one or more pilot regions and a second control channel region of the one or more control channel regions.

Coreset monitor 1125 may monitor, based on the identified configuration, a first pilot region of the one or more pilot regions of the control resource set for a pilot signal for the UE, monitor the shared control channel region of the control resource set for the control channel signal for the UE, monitor, based on the identified configuration, a second pilot region of the one or more pilot regions for a second pilot signal for the UE, and monitor a subset of the set of pilot regions for the pilot signal for the UE. In some cases, the one or more control channel regions are non-overlapping. In some cases, each one of the one or more control channel regions corresponds to one of the one or more pilot regions, the one of the one or more control channel regions and the corresponding one of the one or more pilot regions associated with a same transmission beam. In some cases, the control channel signal is restricted by the configuration to be transmitted within one of the one or more control channel regions. In some cases, the UE is configured to monitor only one of the one or more control channel regions for control channel signals. In some cases, the control channel signal spans at least two of the one or more control channel regions. In some cases, monitoring for the pilot signal includes monitoring, based on the identified configuration, the one or more pilot regions of the control resource set for the pilot signal for the UE, each of the one or more pilot regions time division multiplexed with a corresponding one of the one or more control channel regions. In some cases, the control channel signal in the first control channel region includes a first portion of a control channel transmission for the UE. In some cases, the pilot signal includes a demodulation reference signal (DMRS). In some cases, monitoring for the pilot signal includes monitoring, based on the identified configuration, the one or more pilot regions of the control resource set for the pilot signal for the UE, the one or more pilot regions including a set of time division multiplexed pilot regions for a set of UEs. Coreset monitor 1125 may determine that the one or more pilot regions are associated with a same control channel.

Decoder 1130 may decode, based on the pilot signal, a control channel signal for the UE received in a first control channel region of the one or more control channel regions of the control resource set, decode, based on second pilot signal, a control channel signal for the UE received in a second control channel region of the one or more control channel regions of the control resource set, and decode the control channel signal based on the channel estimate. In some cases, the control channel signal includes downlink control information, or an uplink grant, or a downlink grant, or a combination thereof. In some cases, the control channel signal includes a PDCCH.

Channel estimator 1135 may determine a channel estimate based on the received pilot signal. Channel estimator 1135 may perform independent channel estimation for pilot signals in different pilot regions of the one or more pilot regions. Channel estimator 1135 may perform a joint channel estimation for the one or more pilot regions.

Figure 12:
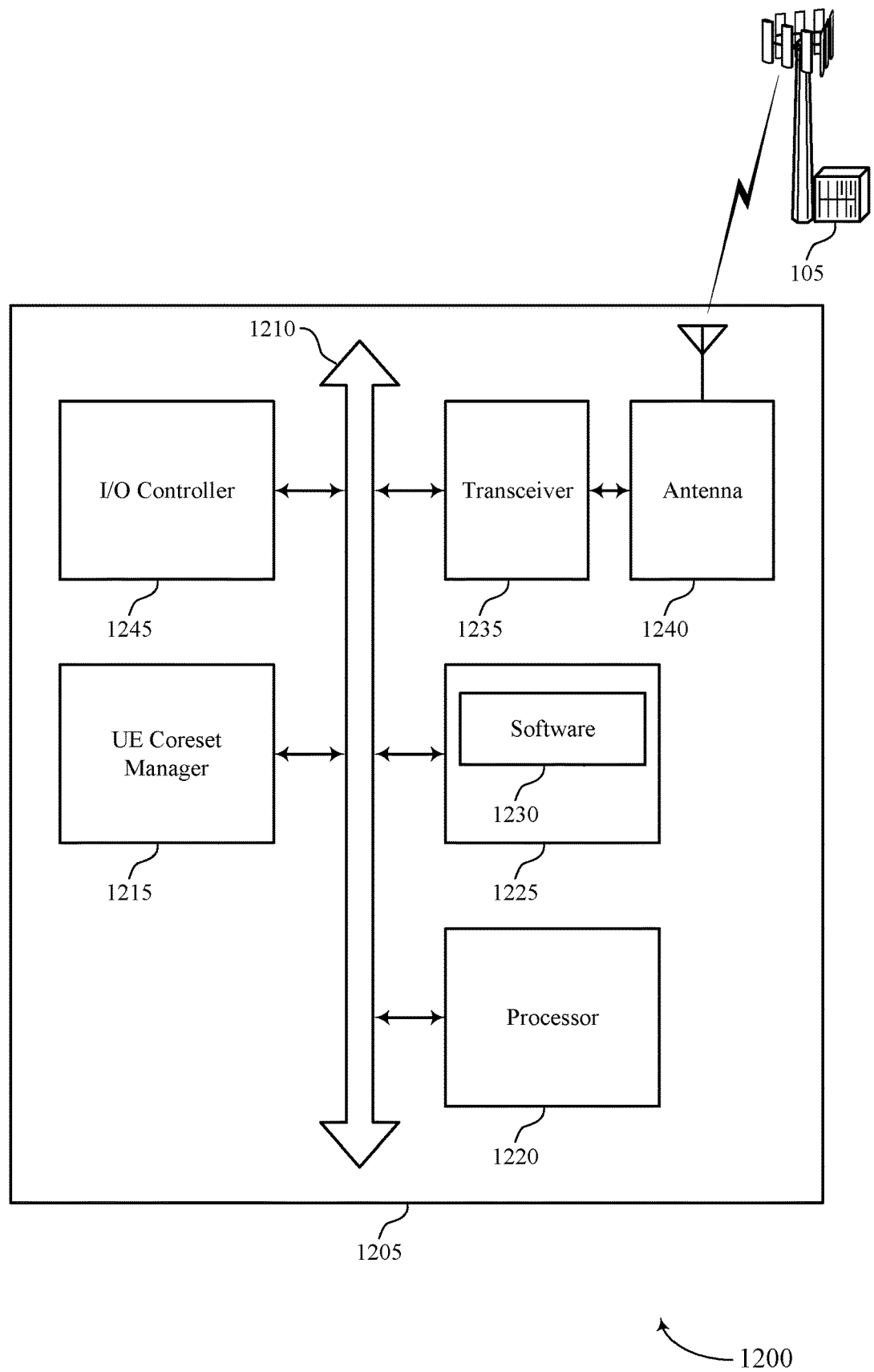
FIG. 12 illustrates a block diagram of a system including a UE that supports control resource set design under single carrier waveform in accordance with aspects of the present disclosure.

FIG. 12 shows a diagram of a system 1200 including a device 1205 that supports control resource set design under single carrier waveform in accordance with aspects of the present disclosure. Device 1205 may be an example of or include the components of wireless device 905, wireless device 1005, or a UE 115 as described above, e.g., with reference to FIGS. 9 and 10. Device 1205 may include components for bi-directional voice and data communications including components for transmitting and receiving communications, including UE coreset manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting control resource set design under single carrier waveform).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support control resource set design under single carrier waveform. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
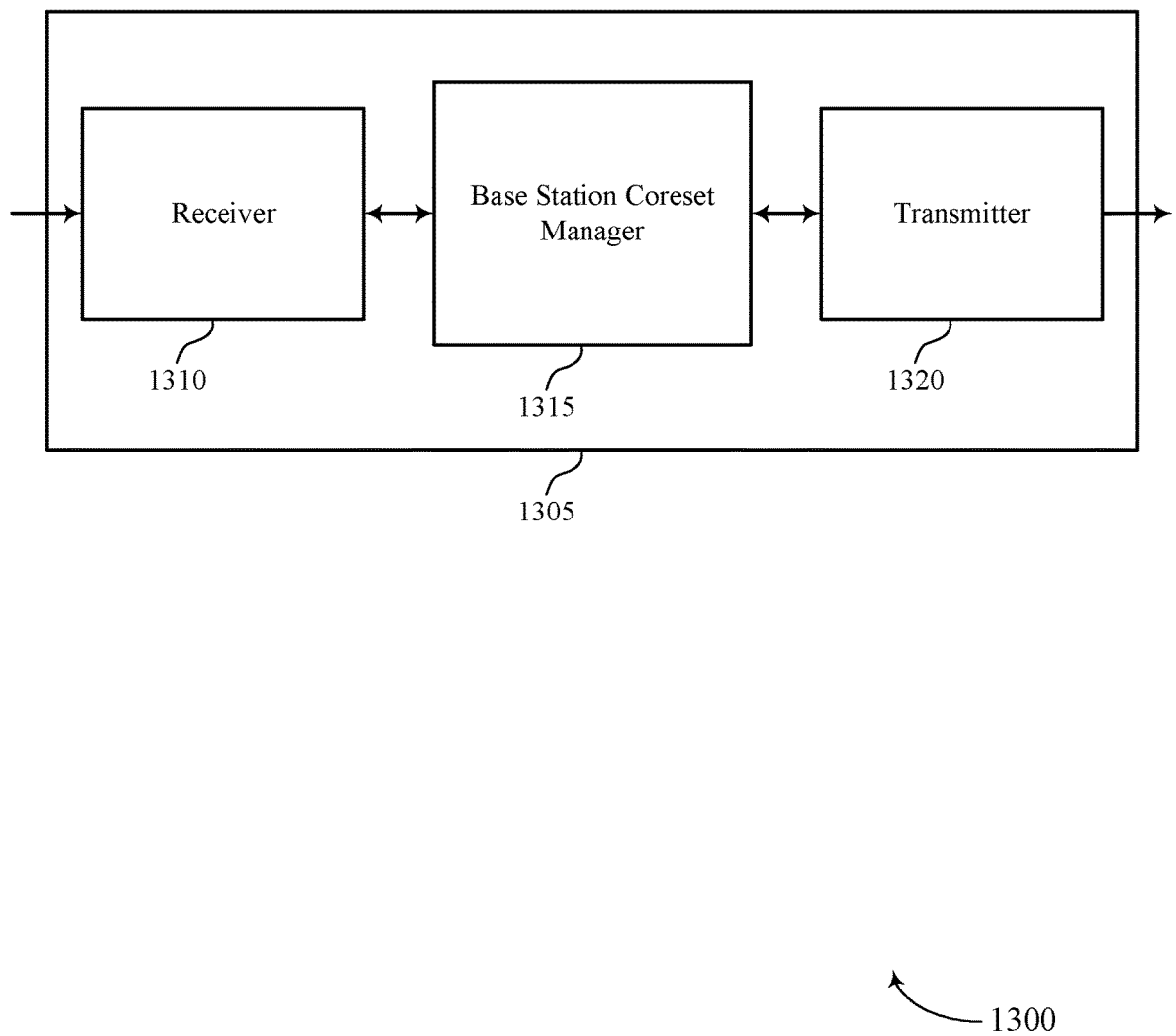
FIGS. 13 through 15 show block diagrams of a device that supports control resource set design under single carrier waveform in accordance with aspects of the present disclosure.

FIG. 13 shows a block diagram 1300 of a wireless device 1305 that supports control resource set design under single carrier waveform in accordance with aspects of the present disclosure. Wireless device 1305 may be an example of aspects of a base station 105 as described herein. Wireless device 1305 may include receiver 1310, base station coreset manager 1315, and transmitter 1320. Wireless device 1305 may also include a processor. Each of these components may be in communication with one another (e.g., via one or more buses).

Receiver 1310 may receive information such as packets, user data, or control information corresponding to various information channels (e.g., control channels, data channels, and information related to control resource set design under single carrier waveform, etc.). Information may be passed on to other components of the device. The receiver 1310 may be an example of aspects of the transceiver 1635 described with reference to FIG. 16. The receiver 1310 may utilize a single antenna or a set of antennas.

Base station coreset manager 1315 may be an example of aspects of the base station coreset manager 1615 described with reference to FIG. 16.

Base station coreset manager 1315 and/or at least some of its various sub-components may be implemented in hardware, software executed by a processor, firmware, or any combination thereof. If implemented in software executed by a processor, the functions of the base station coreset manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station coreset manager 1315 and/or at least some of its various sub-components may be physically located at various positions, including being distributed such that portions of functions are implemented at different physical locations by one or more physical devices. In some examples, base station coreset manager 1315 and/or at least some of its various sub-components may be a separate and distinct component in accordance with various aspects of the present disclosure. In other examples, base station coreset manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station coreset manager 1315 may identify, at the base station, a configuration for a control resource set used to transmit control data using a single carrier waveform transmission, transmit pilot signals in one or more pilot regions of the control resource set, the one or more pilot regions spanning a bandwidth of the single carrier waveform transmission, and transmit control channel signals in one or more control channel regions of the control resource set, the control channel signals corresponding to the pilot signals, and the one or more control channel regions spanning the bandwidth of the single carrier waveform transmission.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
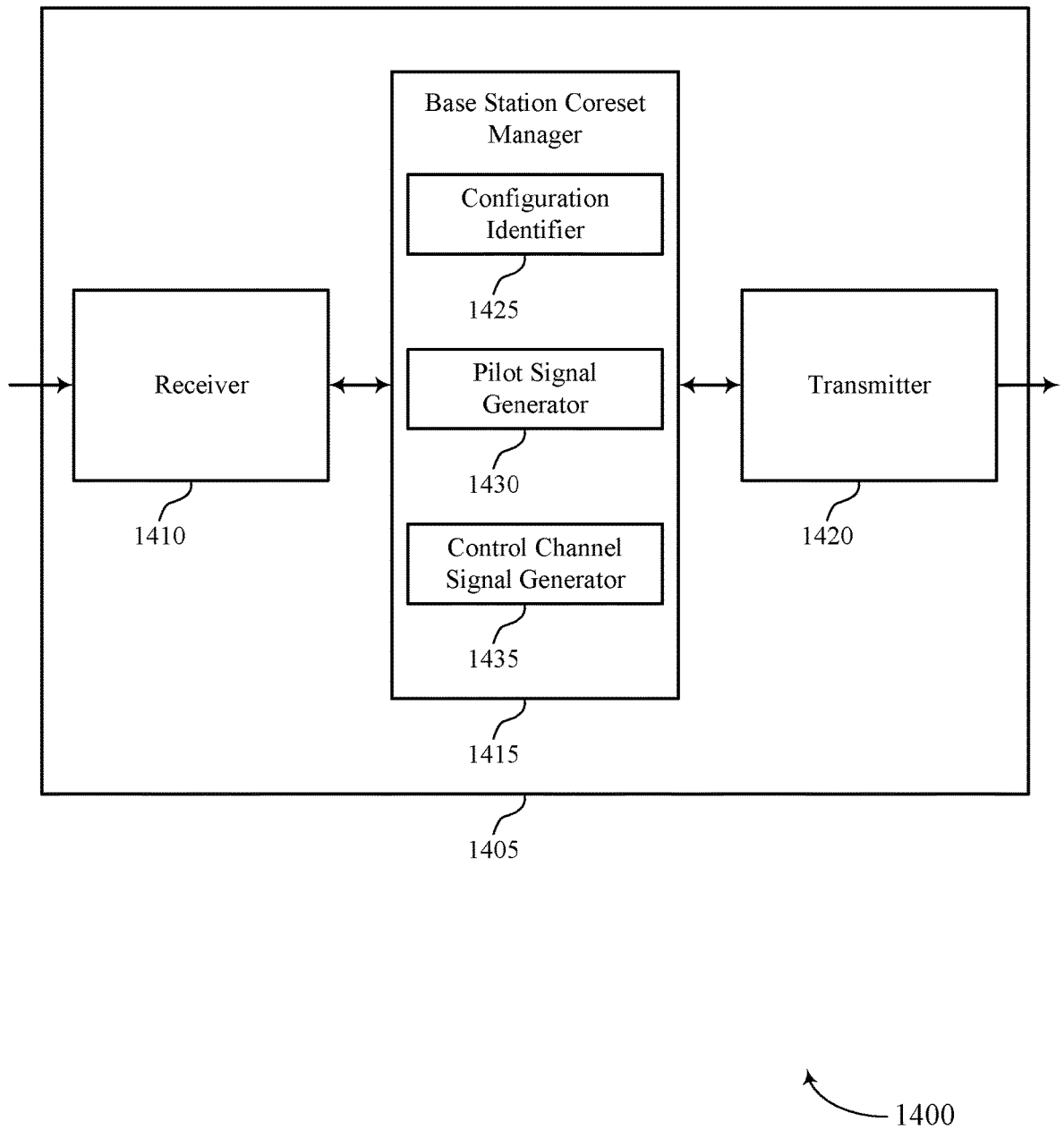

FIG. 14 shows a block diagram 1400 of a wireless device 1405 that supports control resource set design under single carrier waveform in accordance with aspects of the present disclosure. Wireless device 1405 may be an example of aspects of a wireless device 1305 or a base station 105 as described with reference to FIG. 13. Wireless device 1405 may include receiver 1410, base station coreset manager 1415, and transmitter 1420. Wireless device 1405 may also include a processor. Each of these components may be in communication with one another (e.g., via one or more buses).

Receiver 1410 may receive information such as packets, user data, or control information correspond to various information channels (e.g., control channels, data channels, and information related to control resource set design under single carrier waveform, etc.). Information may be passed on to other components of the device. The receiver 1410 may be an example of aspects of the transceiver 1635 described with reference to FIG. 16. The receiver 1410 may utilize a single antenna or a set of antennas.

Base station coreset manager 1415 may be an example of aspects of the base station coreset manager 1615 described with reference to FIG. 16.

Base station coreset manager 1415 may also include configuration identifier 1425, pilot signal generator 1430, and control channel signal generator 1435.

Configuration identifier 1425 may identify, at the base station, a configuration for a control resource set used to transmit control data using a single carrier waveform transmission. In some cases, a first control resource set includes a first pilot region and a first control channel region, the first control channel region for a first portion of a control channel signal for a single UE, and the first pilot region for a first pilot signal corresponding to the first portion of the control channel signal for the single UE. In some cases, a second control resource set includes a second pilot region and a second control channel region, the second control channel region for a second portion of the control channel signal for the single UE, and the second pilot region for a second pilot signal corresponding to the second portion of the control channel signal for the single UE.

Pilot signal generator 1430 may transmit pilot signals in one or more pilot regions of the control resource set, the one or more pilot regions spanning a bandwidth of the single carrier waveform transmission.

Control channel signal generator 1435 may transmit control channel signals in one or more control channel regions of the control resource set, the control channel signals corresponding to the pilot signals, and the one or more control channel regions spanning the bandwidth of the single carrier waveform transmission.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
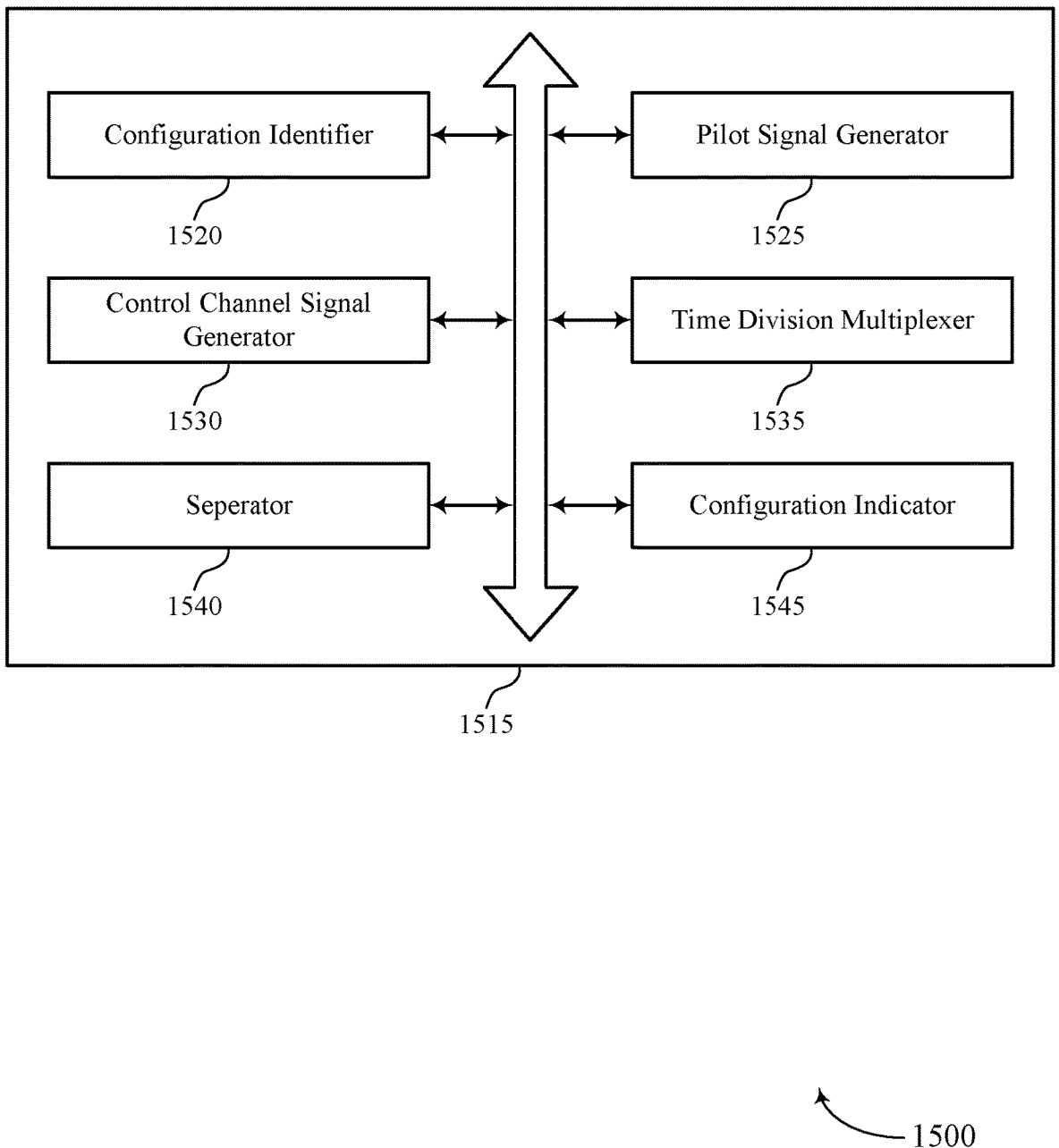

FIG. 15 shows a block diagram 1500 of a base station coreset manager 1515 that supports control resource set design under single carrier waveform in accordance with aspects of the present disclosure. The base station coreset manager 1515 may be an example of aspects of a base station coreset manager 1615 described with reference to FIGS. 13, 14, and 16. The base station coreset manager 1515 may include configuration identifier 1520, pilot signal generator 1525, control channel signal generator 1530, time division multiplexer 1535, separator 1540, and configuration indicator 1545. Each of these modules may communicate, directly or indirectly, with one another (e.g., via one or more buses).

Configuration identifier 1520 may identify, at the base station, a configuration for a control resource set used to transmit control data using a single carrier waveform transmission. In some cases, a first control resource set includes a first pilot region and a first control channel region, the first control channel region for a first portion of a control channel signal for a single UE, and the first pilot region for a first pilot signal corresponding to the first portion of the control channel signal for the single UE. In some cases, a second control resource set includes a second pilot region and a second control channel region, the second control channel region for a second portion of the control channel signal for the single UE, and the second pilot region for a second pilot signal corresponding to the second portion of the control channel signal for the single UE.

Pilot signal generator 1525 may transmit pilot signals in one or more pilot regions of the control resource set, the one or more pilot regions spanning a bandwidth of the single carrier waveform transmission.

Control channel signal generator 1530 may transmit control channel signals in one or more control channel regions of the control resource set, the control channel signals corresponding to the pilot signals, and the one or more control channel regions spanning the bandwidth of the single carrier waveform transmission.

Time division multiplexer 1535 may time division multiplexing each of the pilot signals of the control resource set with each of the control channel signals of the control resource set, time division multiplexing a first pilot signal in a first pilot region of the control resource set for a first UE, a second pilot signal in a second pilot region of the control resource set for a second UE, and a first control channel signal and a second control channel signal in a shared control channel region of the control resource set for at least the first UE and the second UE, and time division multiplexing the pilot signals with corresponding control region groups, the corresponding control region groups including the control channel signals. In some cases, the one or more pilot regions include a single pilot region for one UE and the one or more control channel regions include a single control channel region corresponding to the single pilot region for the one UE. In some cases, the control resource set includes a single pilot region and a single control channel region.

Separator 1540 may insert a cyclic prefix or a guard interval between at least two regions of the control resource set, the at least two regions including at least one of the one or more pilot regions, or at least one of the one or more control channel regions, or a combination thereof.

Configuration indicator 1545 may transmit an indication of the configuration for the control resource set.

Figure 16:
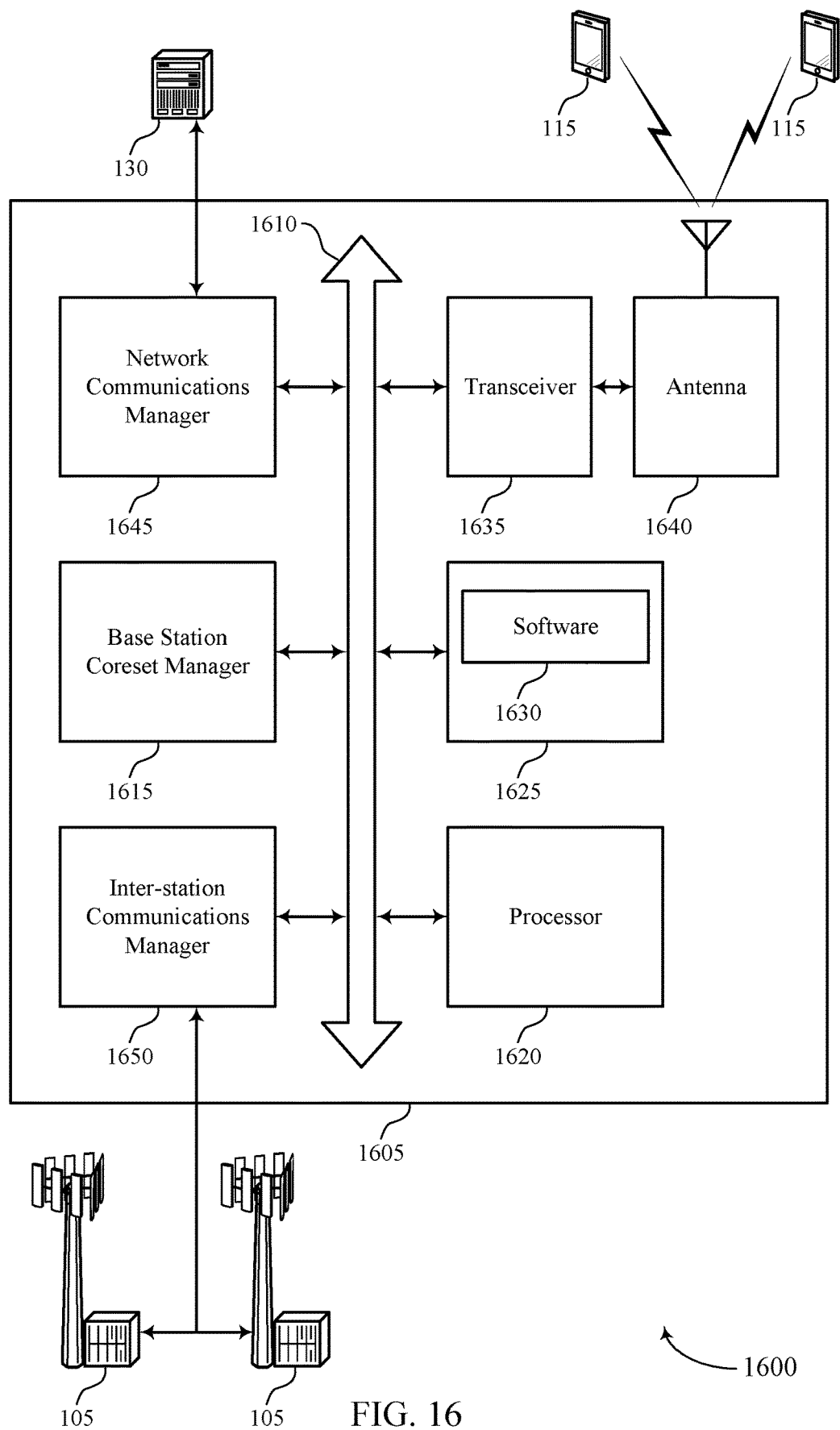
FIG. 16 illustrates a block diagram of a system including a base station that supports control resource set design under single carrier waveform in accordance with aspects of the present disclosure.

FIG. 16 shows a diagram of a system 1600 including a device 1605 that supports control resource set design under single carrier waveform in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station coreset manager 1615, processor 1620, memory 1625, software 1630, transceiver 1635, antenna 1640, network communications manager 1645, and inter-station communications manager 1650. These components may be in electronic communication via one or more buses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting control resource set design under single carrier waveform).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware or software operation such as the interaction with peripheral components or devices.

Software 1630 may include code to implement aspects of the present disclosure, including code to support control resource set design under single carrier waveform. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within a Long Term Evolution (LTE)/LTE-A wireless communication network technology to provide communication between base stations 105.

Figure 17:
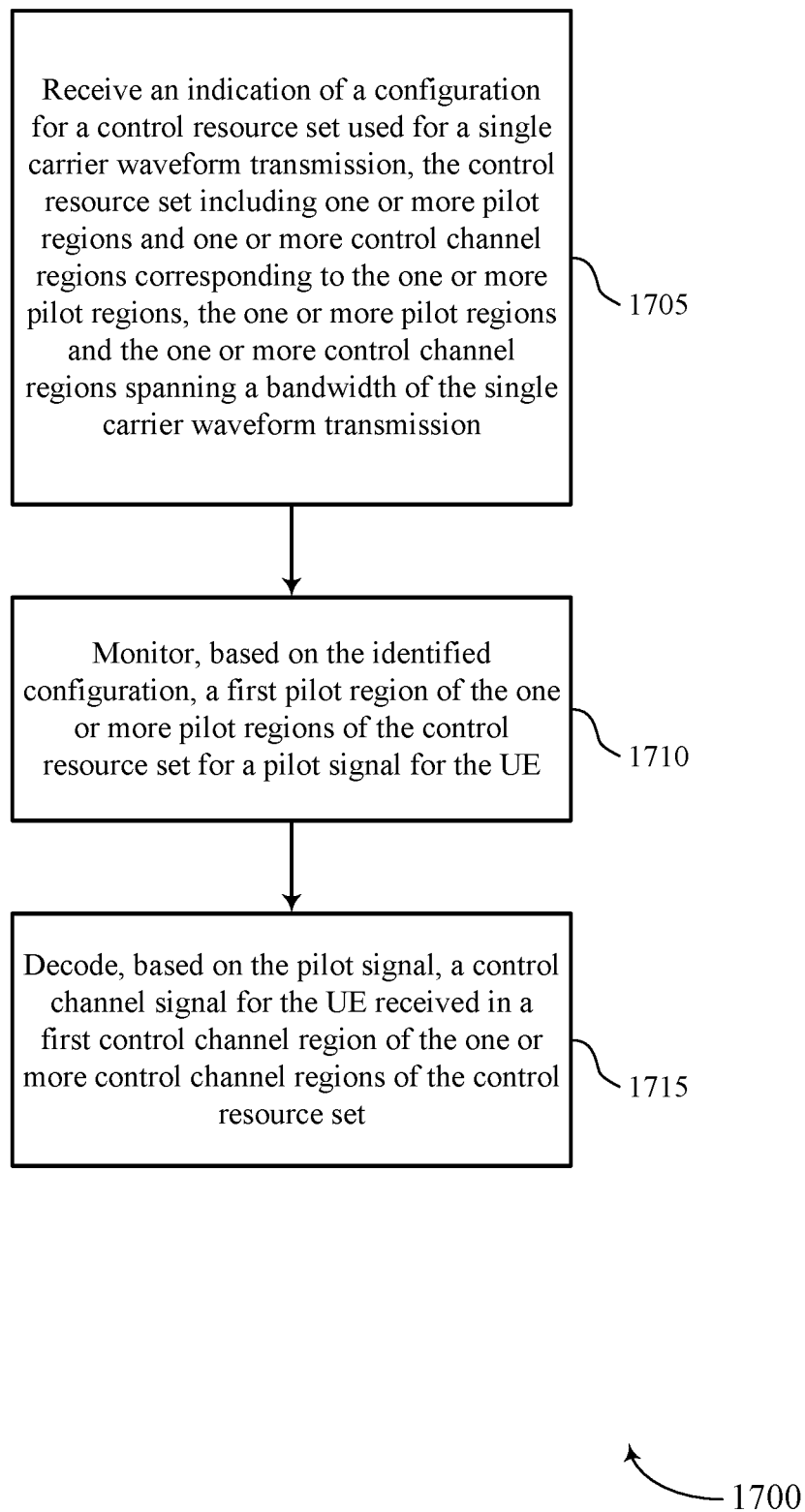
FIGS. 17 through 18 illustrate methods for control resource set design under single carrier waveform in accordance with aspects of the present disclosure.

FIG. 17 shows a flowchart illustrating a method 1700 for control resource set design under single carrier waveform in accordance with aspects of the present disclosure. The operations of method 1700 may be implemented by a UE 115 or its components as described herein. For example, the operations of method 1700 may be performed by a UE coreset manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive an indication of a configuration for a control resource set used for a single carrier waveform transmission, the control resource set comprising one or more pilot regions and one or more control channel regions corresponding to the one or more pilot regions, the one or more pilot regions and the one or more control channel regions spanning a bandwidth of the single carrier waveform transmission. The operations of block 1705 may be performed according to the methods described herein. In certain examples, aspects of the operations of block 1705 may be performed by a configuration identifier as described with reference to FIGS. 9 through 12.

At block 1710 the UE 115 may monitor, based at least in part on the received indication of the configuration, a first pilot region of the one or more pilot regions of the control resource set for a pilot signal for the UE. The operations of block 1710 may be performed according to the methods described herein. In certain examples, aspects of the operations of block 1710 may be performed by a coreset monitor as described with reference to FIGS. 9 through 12.

At block 1715 the UE 115 may decode, based at least in part on the pilot signal, a control channel signal for the UE received in a first control channel region of the one or more control channel regions of the control resource set. The operations of block 1715 may be performed according to the methods described herein. In certain examples, aspects of the operations of block 1715 may be performed by a decoder as described with reference to FIGS. 9 through 12. In a system using single-carrier transmissions, a base station may need to provide multiple pilot signals corresponding to different transmit beams because UEs of the single-carrier system may operate using a number of different bandwidths. From the perspective of any particular UE, the control signal transmission (e.g., a PDCCH) that the UE may receive is based on the bandwidth capability of the UE. Therefore, the UE 115 may monitor each of the plurality of pilot regions in the coreset configuration in order to determine which pilot signals are associated with the UE 115. In turn, the UE 115 may receive a control region group that operates on a bandwidth corresponding to the UE 115.

Additionally, as another benefit of a shared control channel region, it can be shared at a finer time resolution as compared to an OFDM symbol level. In other words, the aggregate resources required for separate control signal portions of three individual UEs may be greater than the total amount of resources of the shared control channel region for the same three UEs.

Figure 18:
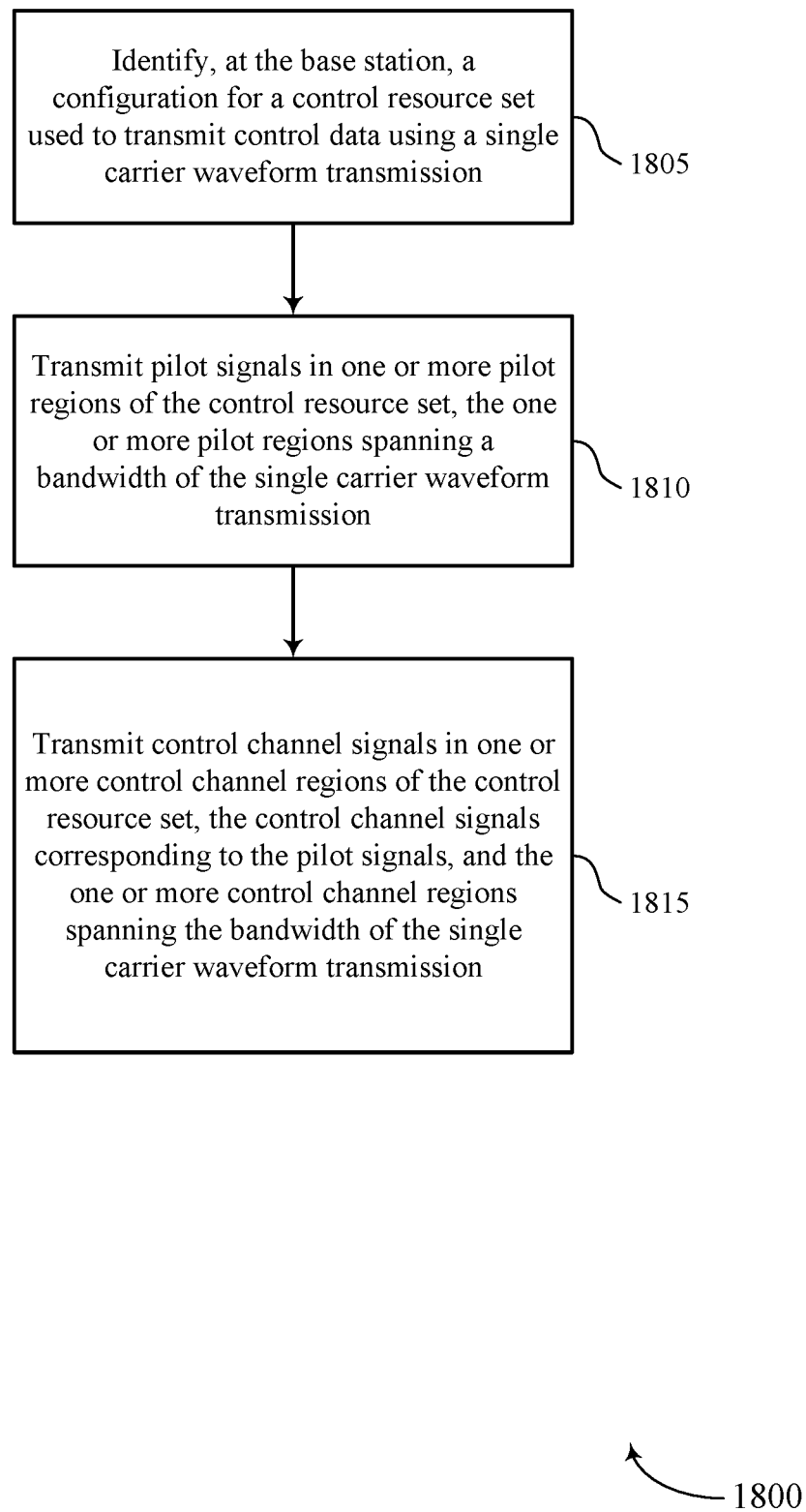

FIG. 18 shows a flowchart illustrating a method 1800 for control resource set design under single carrier waveform in accordance with aspects of the present disclosure. The operations of method 1800 may be implemented by a base station 105 or its components as described herein. For example, the operations of method 1800 may be performed by a base station coreset manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may identify, at the base station, a configuration for a control resource set used to transmit control data using a single carrier waveform transmission. The operations of block 1805 may be performed according to the methods described herein. In certain examples, aspects of the operations of block 1805 may be performed by a configuration identifier as described with reference to FIGS. 13 through 16.

At block 1810 the base station 105 may transmit pilot signals in one or more pilot regions of the control resource set, the one or more pilot regions spanning a bandwidth of the single carrier waveform transmission. The operations of block 1810 may be performed according to the methods described herein. In certain examples, aspects of the operations of block 1810 may be performed by a pilot signal generator as described with reference to FIGS. 13 through 16.

At block 1815 the base station 105 may transmit control channel signals in one or more control channel regions of the control resource set, the control channel signals corresponding to the pilot signals, and the one or more control channel regions spanning the bandwidth of the single carrier waveform transmission. The operations of block 1815 may be performed according to the methods described herein. In certain examples, aspects of the operations of block 1815 may be performed by a control channel signal generator as described with reference to FIGS. 13 through 16. In a system using single-carrier transmissions, a base station may need to provide multiple pilot signals corresponding to different transmit beams because UEs of the single-carrier system may operate using a number of different bandwidths. From the perspective of any particular UE, the control signal transmission (e.g., a PDCCH) that the UE may receive is based on the bandwidth capability of the UE. Therefore, a particular UE may monitor each of the plurality of pilot regions in the coreset configuration in order to determine which pilot signals are associated with the UE. In turn, the UE may receive a control region group that operates on a bandwidth corresponding to the UE.

Additionally, as another benefit of a shared control channel region, it can be shared at a finer time resolution as compared to an OFDM symbol level. In other words, the aggregate resources required for separate control signal portions of three individual UEs may be greater than the total amount of resources of the shared control channel region for the same three UEs.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving an indication of a configuration for a control resource set used for a single carrier waveform transmission, the control resource set comprising one or more pilot regions and one or more control channel regions corresponding to the one or more pilot regions, the one or more pilot regions and the one or more control channel regions spanning a bandwidth of the single carrier waveform transmission;
    monitoring, based at least in part on the received indication of the configuration, the one or more pilot regions of the control resource set for a pilot signal for the UE, each of the one or more pilot regions time division multiplexed with a corresponding one of the one or more control channel regions; and
    decoding, based at least in part on the pilot signal, a control channel signal for the UE received in a first control channel region of the one or more control channel regions of the control resource set.

2. The method of claim 1, wherein:
    the one or more control channel regions are non-overlapping; and
    each one of the one or more control channel regions is associated with one of the one or more pilot regions, the one of the one or more control channel regions and the associated one of the one or more pilot regions associated with a same transmission beam.

3. The method of claim 2, wherein:
    the control channel signal is restricted by the configuration to be transmitted within one of the one or more control channel regions.

4. The method of claim 1, wherein:
    first time resources for the control resource set are of a different size, or overlap at least in part with, or a combination thereof, than second time resources for a second control resource set.

5. The method of claim 1, wherein:
the control channel signal comprises a physical downlink control channel (PDCCH) conveying downlink control information, or an uplink grant, or a downlink grant, or a combination thereof; and
the pilot signal comprises a demodulation reference signal (DMRS).

6. The method of claim 1, further comprising:
performing independent channel estimation for pilot signals in different pilot regions of the one or more pilot regions.

7. The method of claim 1, further comprising:
determining that the one or more pilot regions are associated with a same control channel; and
performing a joint channel estimation for the one or more pilot regions that are associated with the same control channel.

8. The method of claim 1, wherein:
a bandwidth of a single carrier waveform transmission for a first pilot region of the one or more pilot regions and the first control channel region is different than a bandwidth of a single carrier waveform transmission for a second pilot region of the one or more pilot regions and a second control channel region of the one or more control channel regions.

9. A method for wireless communication at a base station, comprising:
identifying, at the base station, a configuration for a control resource set used to transmit control data using a single carrier waveform transmission;
transmitting pilot signals in one or more pilot regions of the control resource set, the one or more pilot regions spanning a bandwidth of the single carrier waveform transmission; and
transmitting control channel signals in one or more control channel regions of the control resource set, each of the pilot signals of the control resource set time division multiplexed with a corresponding one of the control channel signals of the control resource set, and the one or more control channel regions spanning the bandwidth of the single carrier waveform transmission.

10. The method of claim 9, wherein:
the one or more pilot regions comprise a single pilot region for one UE and the one or more control channel regions comprise a single control channel region corresponding to the single pilot region for the one UE.

11. The method of claim 9, wherein:
the control resource set comprises a single pilot region and a single control channel region.

12. The method of claim 9, further comprising:
transmitting an indication of the configuration for the control resource set.

13. An apparatus for wireless communication, comprising:
a processor;
memory in electronic communication with the processor; and
instructions stored in the memory and operable, when executed by the processor, to cause the apparatus to:
receive an indication of a configuration for a control resource set used for a single carrier waveform transmission, the control resource set comprising one or more pilot regions and one or more control channel regions corresponding to the one or more pilot regions, the one or more pilot regions and the one or more control channel regions spanning a bandwidth of the single carrier waveform transmission;
monitor, based at least in part on the received indication of the configuration, the one or more pilot regions of the control resource set for a pilot signal for the UE, each of the one or more pilot regions time division multiplexed with a corresponding one of the one or more control channel regions; and
decode, based at least in part on the pilot signal, a control channel signal for the UE received in a first control channel region of the one or more control channel regions of the control resource set.

14. The apparatus of claim 13, wherein:
the one or more control channel regions are non-overlapping; and
each one of the one or more control channel regions is associated with one of the one or more pilot regions, the one of the one or more control channel regions and the associated one of the one or more pilot regions associated with a same transmission beam.

15. The apparatus of claim 14, wherein:
the control channel signal is restricted by the configuration to be transmitted within one of the one or more control channel regions.

16. The apparatus of claim 13, wherein:
first time resources for the control resource set are of a different size, or overlap at least in part with, or a combination thereof, than second time resources for a second control resource set.

17. The apparatus of claim 13, wherein:
the control channel signal comprises a physical downlink control channel (PDCCH) conveying downlink control information, or an uplink grant, or a downlink grant, or a combination thereof; and
the pilot signal comprises a demodulation reference signal (DMRS).

18. The apparatus of claim 13, wherein the instructions are further executable by the processor to cause the apparatus to:
perform independent channel estimation for pilot signals in different pilot regions of the one or more pilot regions.

19. The apparatus of claim 13, wherein the instructions are further executable by the processor to cause the apparatus to:
determine that the one or more pilot regions are associated with a same control channel; and
perform a joint channel estimation for the one or more pilot regions that are associated with the same control channel.

20. The apparatus of claim 13, wherein:
a bandwidth of a single carrier waveform transmission for a first pilot region of the one or more pilot regions and the first control channel region is different than a bandwidth of a single carrier waveform transmission for a second pilot region of the one or more pilot regions and a second control channel region of the one or more control channel regions.

21. An apparatus for wireless communication, comprising:
a processor;
memory in electronic communication with the processor; and
instructions stored in the memory and operable, when executed by the processor, to cause the apparatus to:

identify, at the apparatus, a configuration for a control resource set used to transmit control data using a single carrier waveform transmission;

transmit pilot signals in one or more pilot regions of the control resource set, the one or more pilot regions spanning a bandwidth of the single carrier waveform transmission; and transmit control channel signals in one or more control channel regions of the control resource set, each of the pilot signals of the control resource set time division multiplexed with a corresponding one of the control channel signals of the control resource set, and the one or more control channel regions spanning the bandwidth of the single carrier waveform transmission.

22. The apparatus of claim 21, wherein:
the one or more pilot regions comprise a single pilot region for one UE and the one or more control channel regions comprise a single control channel region corresponding to the single pilot region for the one UE.

23. The apparatus of claim 21, wherein:
the one or more pilot regions comprise a single pilot region for one UE and the one or more control channel regions comprise a single control channel region corresponding to the single pilot region for the one UE.

24. The apparatus of claim 21, wherein:
the control resource set comprises a single pilot region and a single control channel region.

25. A method for wireless communication at a user equipment (UE), comprising:
receiving an indication of a configuration for a control resource set used for a single carrier waveform transmission, the control resource set comprising one or more pilot regions and one or more control channel regions corresponding to the one or more pilot regions, the one or more pilot regions and the one or more control channel regions spanning a bandwidth of the single carrier waveform transmission;

monitoring, based at least in part on the received indication of the configuration, the one or more pilot regions of the control resource set for the pilot signal for the UE, the one or more pilot regions comprising a plurality of time division multiplexed pilot regions for a plurality of UEs; and decoding, based at least in part on the pilot signal, a control channel signal for the UE received in a first control channel region of the one or more control channel regions of the control resource set.

26. The method of claim 25, further comprising:
monitoring a shared control channel region of the control resource set for the control channel signal for the UE.

27. The method of claim 25, wherein:
first time resources for the control resource set are of a different size, or overlap at least in part with, or a combination thereof, than second time resources for a second control resource set.

28. The method of claim 25, wherein:
the control channel signal comprises a physical downlink control channel (PDCCH) conveying downlink control information, or an uplink grant, or a downlink grant, or a combination thereof; and
the pilot signal comprises a demodulation reference signal (DMRS).

29. The method of claim 25, further comprising:
performing independent channel estimation for pilot signals in different pilot regions of the one or more pilot regions.

30. The method of claim 25, further comprising:
determining that the one or more pilot regions are associated with a same control channel; and
performing a joint channel estimation for the one or more pilot regions that are associated with the same control channel.

31. The method of claim 25, wherein:
a bandwidth of a single carrier waveform transmission for a first pilot region of the one or more pilot regions and the first control channel region is different than a bandwidth of a single carrier waveform transmission for a second pilot region of the one or more pilot regions and a second control channel region of the one or more control channel regions.

32. An apparatus for wireless communication, comprising:
a processor;
memory in electronic communication with the processor; and
instructions stored in the memory and operable, when executed by the processor, to cause the apparatus to:
receive an indication of a configuration for a control resource set used for a single carrier waveform transmission, the control resource set comprising one or more pilot regions and one or more control channel regions corresponding to the one or more pilot regions, the one or more pilot regions and the one or more control channel regions spanning a bandwidth of the single carrier waveform transmission;

monitor, based at least in part on the received indication of the configuration, the one or more pilot regions of the control resource set for the pilot signal for the UE, the one or more pilot regions comprising a plurality of time division multiplexed pilot regions for a plurality of UEs; and decode, based at least in part on the pilot signal, a control channel signal for the UE received in a first control channel region of the one or more control channel regions of the control resource set.

33. The apparatus of claim 32, wherein the instructions are further executable by the processor to cause the apparatus to:
monitor a shared control channel region of the control resource set for the control channel signal for the UE.

34. The apparatus of claim 32, wherein:
first time resources for the control resource set are of a different size, or overlap at least in part with, or a combination thereof, than second time resources for a second control resource set.

35. The apparatus of claim 32, wherein:
the control channel signal comprises a physical downlink control channel (PDCCH) conveying downlink control information, or an uplink grant, or a downlink grant, or a combination thereof; and
the pilot signal comprises a demodulation reference signal (DMRS).

36. The apparatus of claim 32, wherein the instructions are further executable by the processor to cause the apparatus to:
perform independent channel estimation for pilot signals in different pilot regions of the one or more pilot regions.

37. The apparatus of claim 32, wherein the instructions are further executable by the processor to cause the apparatus to:

determine that the one or more pilot regions are associated with a same control channel; and perform a joint channel estimation for the one or more pilot regions that are associated with the same control channel.

38. The apparatus of claim 32, wherein:

a bandwidth of a single carrier waveform transmission for a first pilot region of the one or more pilot regions and the first control channel region is different than a bandwidth of a single carrier waveform transmission for a second pilot region of the one or more pilot regions and a second control channel region of the one or more control channel regions.

39. A method for wireless communication at a base station, comprising:

identifying, at the base station, a configuration for a control resource set used to transmit control data using a single carrier waveform transmission;

time division multiplexing a first pilot signal in a first pilot region of the control resource set for a first UE, a second pilot signal in a second pilot region of the control resource set for a second UE, and a first control channel signal and a second control channel signal in a shared control channel region of the control resource set for at least the first UE and the second UE;

transmitting pilot signals in one or more pilot regions of the control resource set, the one or more pilot regions spanning a bandwidth of the single carrier waveform transmission; and transmitting control channel signals in one or more control channel regions of the control resource set, the control channel signals corresponding to the pilot signals, and the one or more control channel regions spanning the bandwidth of the single carrier waveform transmission.

40. The method of claim 39, further comprising:

time division multiplexing the pilot signals with corresponding control region groups, the corresponding control region groups comprising the control channel signals.

41. An apparatus for wireless communication, comprising:

a processor;

memory in electronic communication with the processor; and instructions stored in the memory and operable, when executed by the processor, to cause the apparatus to:

identify, at the apparatus, a configuration for a control resource set used to transmit control data using a single carrier waveform transmission;

time division multiplex a first pilot signal in a first pilot region of the control resource set for a first UE, a second pilot signal in a second pilot region of the control resource set for a second UE, and a first control channel signal and a second control channel signal in a shared control channel region of the control resource set for at least the first UE and the second UE;

transmit pilot signals in one or more pilot regions of the control resource set, the one or more pilot regions spanning a bandwidth of the single carrier waveform transmission; and transmit control channel signals in one or more control channel regions of the control resource set, the control channel signals corresponding to the pilot signals, and the one or more control channel regions spanning the bandwidth of the single carrier waveform transmission.

42. The apparatus of claim 41, wherein the instructions are operable to cause the apparatus to:

time division multiplex the pilot signals with corresponding control region groups, the corresponding control region groups comprising the control channel signals.

* * * * *